(12) United States Patent
Miyazaki et al.

(10) Patent No.: US 8,396,218 B2
(45) Date of Patent: Mar. 12, 2013

(54) CRYPTOGRAPHIC MODULE DISTRIBUTION SYSTEM, APPARATUS, AND PROGRAM

(75) Inventors: Shingo Miyazaki, Fuchu (JP); Takanori Nakamizo, Chofu (JP); Akito Niwa, Mitaka (JP); Koji Okada, Tokyo (JP); Kouya Tochikubo, Yokohama (JP); Shigeyuki Fukushima, Fuchu (JP); Chiaki Ishikawa, Tokyo (JP); Noboru Koshizuka, Tokyo (JP); Ken Sakamura, Tokyo (JP)

(73) Assignees: Toshiba Solutions Corporation, Tokyo (JP); Yokosuka Telecom Research Park, Inc., Yokosuka-shi (JP)

( * ) Notice: Subject to any disclaimer, the term of this patent is extended or adjusted under 35 U.S.C. 154(b) by 1113 days.

(21) Appl. No.: 12/233,125

(22) Filed: Sep. 18, 2008

(65) Prior Publication Data

US 2009/0138708 A1 May 28, 2009

(30) Foreign Application Priority Data

Sep. 28, 2007 (JP) ................................. 2007-255963

(51) Int. Cl.
*H04L 9/00* (2006.01)
(52) U.S. Cl. ........ 380/259; 713/172; 713/181; 713/189; 380/284
(58) Field of Classification Search ........................ None
See application file for complete search history.

(56) References Cited

U.S. PATENT DOCUMENTS

| | | | | |
|---|---|---|---|---|
| 5,805,712 A * | 9/1998 | Davis | ............................. | 713/173 |
| 7,079,655 B1 * | 7/2006 | Tochikubo et al. | ........... | 380/281 |
| 7,096,357 B1 | 8/2006 | Tochikubo et al. | | |
| 7,270,193 B2 * | 9/2007 | Hashimoto et al. | ........... | 713/175 |
| 7,418,598 B1 * | 8/2008 | Le Quere | ...................... | 713/193 |
| 2005/0246539 A1 * | 11/2005 | Cofta et al. | ................... | 713/176 |

FOREIGN PATENT DOCUMENTS

| | | |
|---|---|---|
| JP | 4-268844 | 9/1992 |
| JP | 10-41934 | 2/1998 |
| JP | 10-242957 | 9/1998 |
| JP | 2000-232442 | 8/2000 |
| JP | 2000-261427 | 9/2000 |
| JP | 2001-127751 | 5/2001 |
| JP | 2001-339384 | 12/2001 |
| JP | 2002-41483 | 2/2002 |
| JP | 2002-236618 | 8/2002 |
| JP | 2003-32241 | 1/2003 |
| JP | 2003-318874 | 11/2003 |
| JP | 2004-274480 | 9/2004 |
| JP | 2004-343812 | 12/2004 |
| JP | 2006-157735 | 6/2006 |
| JP | 2006-211728 | 8/2006 |

OTHER PUBLICATIONS

Schneier, Applied Cryptography, 1996, John Wiley & Sons, $2^{nd}$ Edition, pp. 30-31, 455-56.*
Chinese Office Action issued Oct. 13, 2010, in Patent Application No. 200810173775.3 (with English-language translation).
Office Action mailed Oct. 16, 2012 in Japanese Patent Application No. 2007-255963 filed Sep. 28, 2007 (with English translation).

* cited by examiner

*Primary Examiner* — Minh Dinh
(74) *Attorney, Agent, or Firm* — Oblon, Spivak, McClelland, Maier & Neustadt, L.L.P.

(57) ABSTRACT

In a cryptographic module distribution system, a cryptographic management server apparatus encrypts a cryptographic module using a key shared by a cryptographic apparatus, and transmits the encrypted cryptographic module to a client apparatus. The client apparatus transmits the encrypted cryptographic module to a cryptographic apparatus. The cryptographic apparatus decrypts the encrypted cryptographic module using the key shared by the cryptographic management server apparatus, and transmits the decrypted cryptographic module to the client apparatus. The client apparatus stores the received cryptographic module.

35 Claims, 15 Drawing Sheets

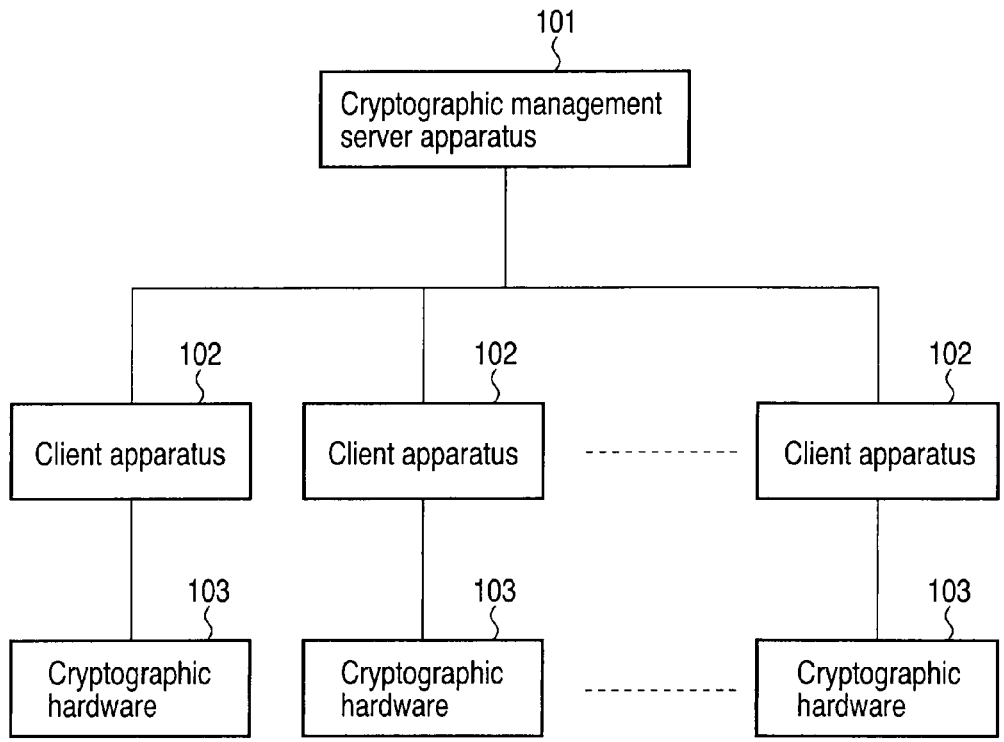
F I G. 1
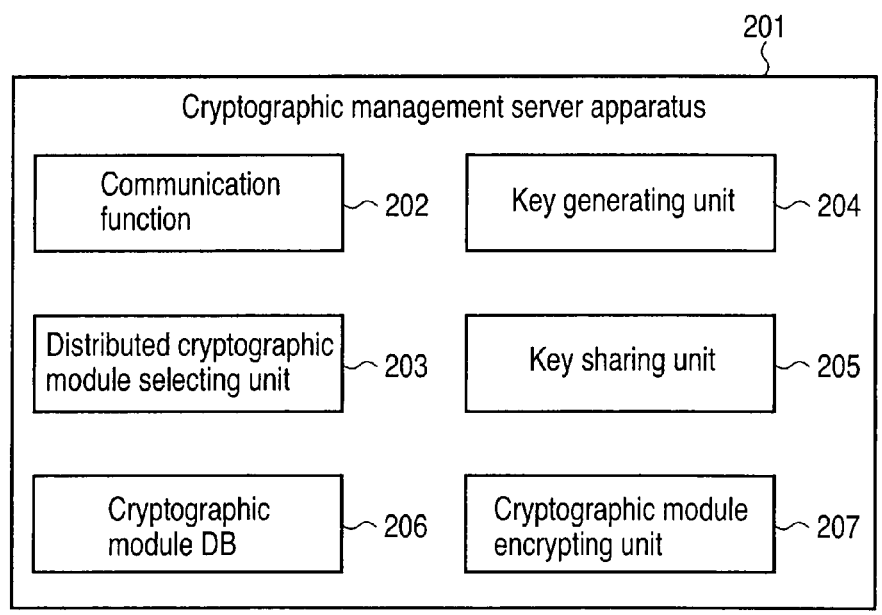
F I G. 2

| Terminal ID | Cryptographic module ID | |
|---|---|---|
| | Installed cryptographic module | Installable cryptographic module |
| 00000001 | 020200021061<br>060200021061<br>0902000F0001<br>⋮ | 020200021062<br>060200021062<br>060200021063<br>⋮ |
| 00000002 | 050200021061<br>0902000F0001<br>⋮ | 050200021062<br>050200021063<br>060200021063<br>⋮ |
| | | |

F I G. 6

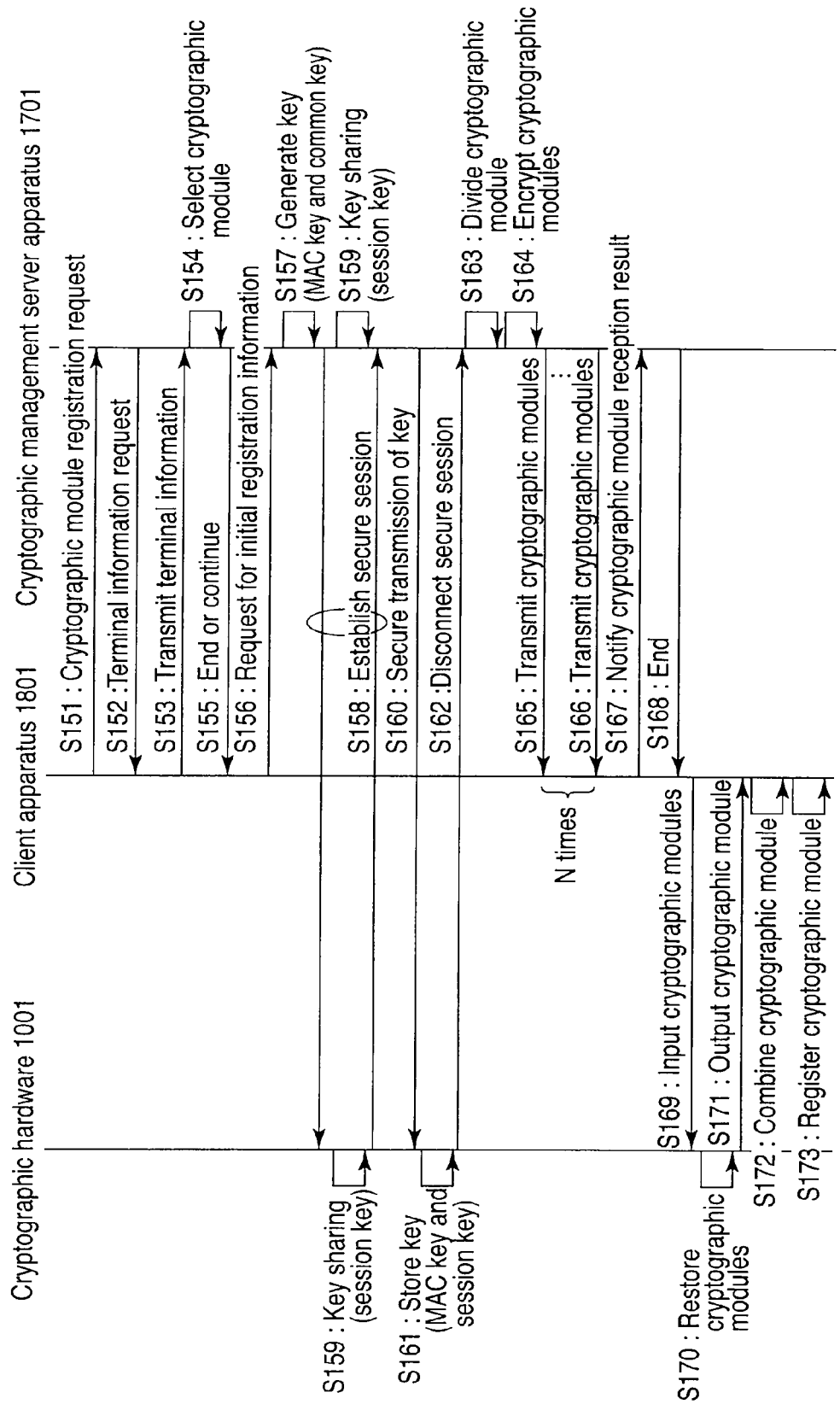
F I G. 22

CRYPTOGRAPHIC MODULE DISTRIBUTION SYSTEM, APPARATUS, AND PROGRAM

CROSS-REFERENCE TO RELATED APPLICATIONS

This application is based upon and claims the benefit of priority from prior Japanese Patent Application No. 2007-255963, filed Sep. 28, 2007, the entire contents of which are incorporated herein by reference.

BACKGROUND OF THE INVENTION

1. Field of the Invention

The present invention relates to a cryptographic module distribution system, an apparatus, and a program.

2. Description of the Related Art

In recent years, a method of stably transmitting communication data between a server and a client apparatus without it being intercepted or tampered with has been developed. In addition, a method of easily updating or adding a cryptographic module operated in the client apparatus has been developed.

The cryptographic module is a program in which a cryptographic algorithm for encrypting/decrypting, generating/validating a signature, and generating/validating a message authentication code is incorporated so as to be executable.

For example, the following methods have been proposed: a method of distributing a ciphertext with a cryptographic module implementing a new cryptographic algorithm for decrypting the ciphertext (see Jpn. Pat. Appln. KOKAI Publication No. 10-41934); and a method of using a cryptographic module implementing a cryptographic algorithm shared between a server and a client apparatus to update confidential information (new cryptographic module) (see Jpn. Pat. Appln. KOKAI Publication No. 2000-261427).

However, the method disclosed in Jpn. Pat. Appln. KOKAI Publication No. 10-41934 has a problem in that the client apparatus cannot validate the transmitted new cryptographic module.

Further, in the method disclosed in Jpn. Pat. Appln. KOKAI Publication No. 2000-261427, the server and the client apparatus need to share a cryptographic module implementing the same stable cryptographic algorithm. Therefore, a system which does not share the cryptographic module implementing the stable cryptographic algorithm cannot receive or transmit confidential information.

BRIEF SUMMARY OF THE INVENTION

An object of the invention is to provide a cryptographic module distribution system, an apparatus, and a program capable of transmitting/receiving confidential information while ensuring security.

In a first aspect of the present invention, there is provided a cryptographic module distribution system comprising: a cryptographic management server apparatus; a cryptographic apparatus; and a client apparatus, wherein the cryptographic management server apparatus, the cryptographic apparatus, and the client apparatus are connected so as to communicate with one other, the cryptographic management server apparatus includes: a cryptographic module storage device which stores a cryptographic module; a key sharing device configured to share a shared key with the cryptographic apparatus; a cryptographic module encrypting device configured to encrypt the cryptographic module with the shared key; and a client apparatus communication device configured to transmit the encrypted cryptographic module to the client apparatus, the cryptographic apparatus includes: a key sharing device configured to share a shared key with the cryptographic management server apparatus; a cryptographic module decrypting device configured to receive the encrypted cryptographic module from the client apparatus, and decrypt the received encrypted cryptographic module with the shared key; and a client apparatus communication device configured to transmit the decrypted cryptographic module to the client apparatus, and the client apparatus includes: a server communication device configured to receive the encrypted cryptographic module from the cryptographic management server apparatus; a cryptographic apparatus communication device configured to transmit the received encrypted cryptographic module to the cryptographic apparatus, and receive the decrypted cryptographic module from the cryptographic apparatus; and a cryptographic module storage device which stores the cryptographic module received from the cryptographic apparatus communication device.

In a second aspect of the present invention, there is provided a cryptographic module distribution system comprising: a cryptographic management server apparatus; a cryptographic apparatus; and a client apparatus, wherein the cryptographic management server apparatus, the cryptographic apparatus, and the client apparatus are connected so as to communicate with each other, the cryptographic management server apparatus includes: a cryptographic module storage device which stores a cryptographic module; a key sharing device configured to share a shared key with the cryptographic apparatus; a message authentication code generating device configured to generate a message authentication code for identifying the cryptographic module with the shared key; and a client apparatus communication device configured to transmit the cryptographic module and the message authentication code to the client apparatus, the cryptographic apparatus includes: a key sharing device configured to share a shared key with the cryptographic management server apparatus, the shared key being stored in a key storage device; a message authentication code validation device which receives the message authentication code from the client apparatus, and uses the shared key stored in the key storage device to validate the received message authentication code; and a client apparatus communication device configured to transmit the validation result to the client apparatus, and the client apparatus includes: a server communication device configured to receive the cryptographic module and the message authentication code from the cryptographic management server apparatus; a cryptographic apparatus communication device configured to transmit the message authentication code received from the server communication device to the cryptographic apparatus, and receive the validation result of the message authentication code; and a cryptographic module storage device which stores the cryptographic module received from the cryptographic apparatus communication device when the validation result indicates that the message authentication code is valid.

BRIEF DESCRIPTION OF THE SEVERAL VIEWS OF THE DRAWING

FIG. 1 is a diagram illustrating the structure of a cryptographic module distribution system according to a first embodiment of the invention;

FIG. 2 is a block diagram illustrating the structure of a cryptographic management server apparatus according to the first embodiment;

FIG. 6 is a diagram illustrating a correspondence table between the identification information of a terminal and the identification information of a cryptographic module according to the first embodiment;

FIG. 22 is a sequence diagram illustrating an example of the operation of a cryptographic module distribution system according to the sixth embodiment.

DETAILED DESCRIPTION OF THE INVENTION

First Embodiment

Figure 3:
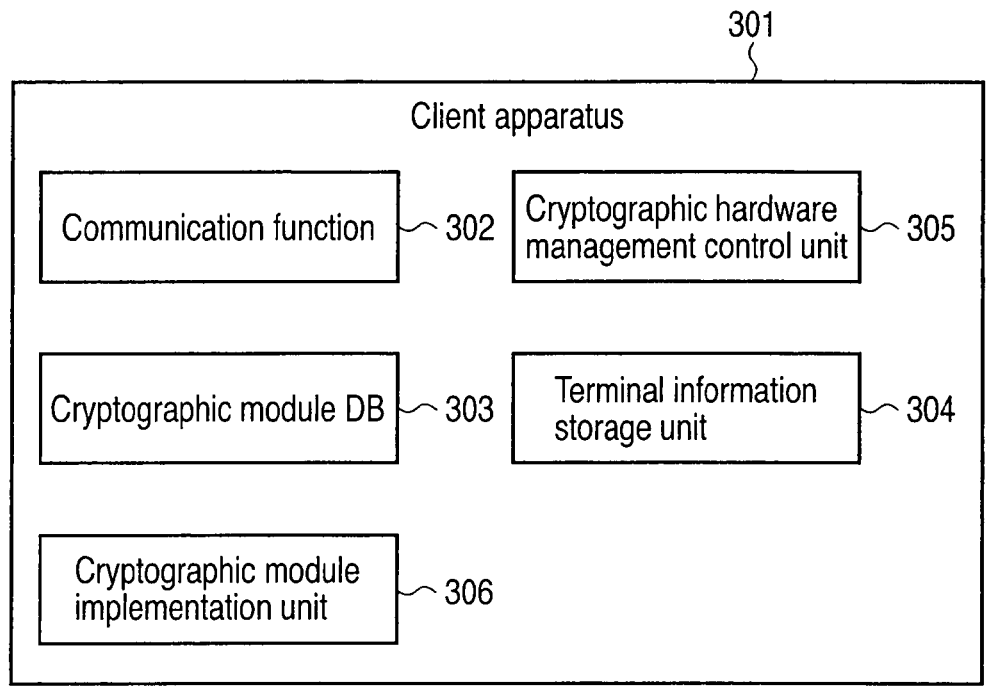
FIG. 3 is a block diagram illustrating the structure of a client apparatus according to the first embodiment.

Hereinafter, an example of the operation of a cryptographic management server using cryptographic hardware to distribute a cryptographic module to a client apparatus in a cryptographic module distribution system will be described in detail.

In this embodiment, cryptographic hardware is used as a cryptographic apparatus, but the cryptographic apparatus is not limited to hardware. Software may be incorporated as the cryptographic apparatus.

FIG. 1 is a diagram illustrating the structure of a cryptographic module distribution system according to a first embodiment of the invention.

The cryptographic module distribution system according to this embodiment includes: a cryptographic management server apparatus 101; client apparatuses 102; and cryptographic hardware components 103 connected to the corresponding client apparatuses 102. The cryptographic management server apparatus 101 stores cryptographic modules, establishes a secure session between the cryptographic hardware components 103 that have tamper resistance and implement cryptographic processing as hardware, and stably distributes a cryptographic module to the client apparatus 102.

In the first embodiment, an initial cryptographic module is encrypted by a common key encryption scheme, and then distributed from the cryptographic management server apparatus 101 to the cryptographic hardware component 103. In this case, a common key is used for communication between the cryptographic management server apparatus 101 and the cryptographic hardware component 103.

Next, the structure of the first embodiment of the invention will be described.

FIG. 2 is a block diagram illustrating the structure of the cryptographic management server apparatus according to the first embodiment of the invention. A cryptographic management server apparatus 201 includes a communication function 202, a distributed cryptographic module selecting unit 203, a key generating unit 204, a key sharing unit 205, a cryptographic module DB 206, and a cryptographic module encrypting unit 207. The cryptographic management server apparatus 201 corresponds to the cryptographic management server apparatus 101 shown in FIG. 1.

The communication function 202 communicates with a client apparatus 301 to transmit or receive various information items. The distributed cryptographic module selecting unit 203 reads out a cryptographic module from the cryptographic module DB 206 on the basis of, for example, terminal ID information of the client apparatus 301. The key generating unit 204 generates a common key for transmitting the cryptographic module to a cryptographic hardware component 401. The key sharing unit 205 shares a key with a key sharing unit 404 of the cryptographic hardware component 401, and uses a generated session key to transmit the common key generated by the key generating unit 204 to the cryptographic hardware component 401. The cryptographic module DB 206 has stored therein a plurality of cryptographic modules beforehand. The cryptographic module encrypting unit 207 encrypts the cryptographic module to be transmitted to the cryptographic hardware component 401 using the key generated by the key generating unit 204.

FIG. 3 is a block diagram illustrating the structure of the client apparatus according to the first embodiment of the invention. The client apparatus 301 includes: a communication function 302, a cryptographic module DB 303, a terminal information storage unit 304, a cryptographic hardware management control unit 305, and a cryptographic module implementation unit 306. The client apparatus 301 corresponds to the client apparatus 102 shown in FIG. 1.

The communication function 302 communicates with the cryptographic management server apparatus 201 to transmit or receive various information items. The cryptographic module DB 303 stores the cryptographic module transmitted from the cryptographic management server apparatus 201. The terminal information storage unit 304 stores terminal information, which is identification information of the client apparatus 301, and stores performance information, which is numerical information of a CPU or memory capacity, or information of an installed application so as to be associated with terminal identification information, which is identification information of the client apparatus 301. The cryptographic hardware management control unit 305 communicates with the cryptographic hardware component 401 to acquire the cryptographic module transmitted from the cryptographic management server apparatus 201. The cryptographic module implementation unit 306 has the received cryptographic module therein so as to be available, and performs cryptographic processing.

Figure 4:
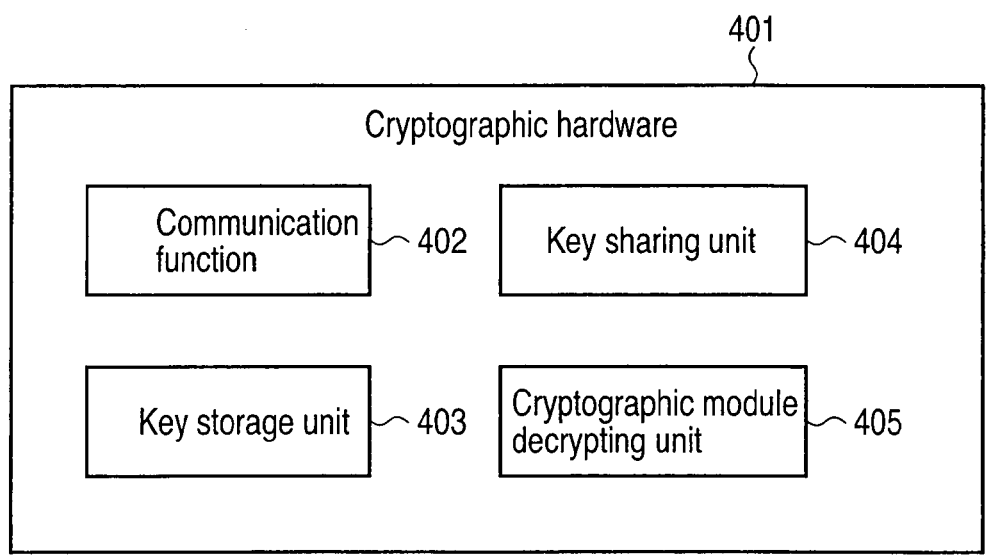
FIG. 4 is a block diagram illustrating the structure of a cryptographic hardware component according to the first embodiment.

FIG. 4 is a block diagram illustrating the structure of the cryptographic hardware component according to the first embodiment of the invention. The cryptographic hardware component 401 includes a communication function 402, a key storage unit 403, a key sharing unit 404, and a cryptographic module decrypting unit 405. The cryptographic hardware component 401 corresponds to the cryptographic hardware component 103 shown in FIG. 1.

The communication function 402 communicates with the client apparatus 301 or the cryptographic management server apparatus 201 through the cryptographic hardware management control unit 305 of the client apparatus 301. The key storage unit 403 stores the common key transmitted from the cryptographic management server apparatus 201. The key sharing unit 404 shares a key with the key sharing unit 205 of the cryptographic management server apparatus 201, and uses the generated session key to transmit the common key generated by the key generating unit 204 to the cryptographic hardware component 401. The cryptographic module decrypting unit 405 uses the common key stored in the key storage unit 403 to decrypt received data (cryptographic module).

Next, an example of the operation of the first embodiment will be described with reference to FIG. 5.

Figure 5:
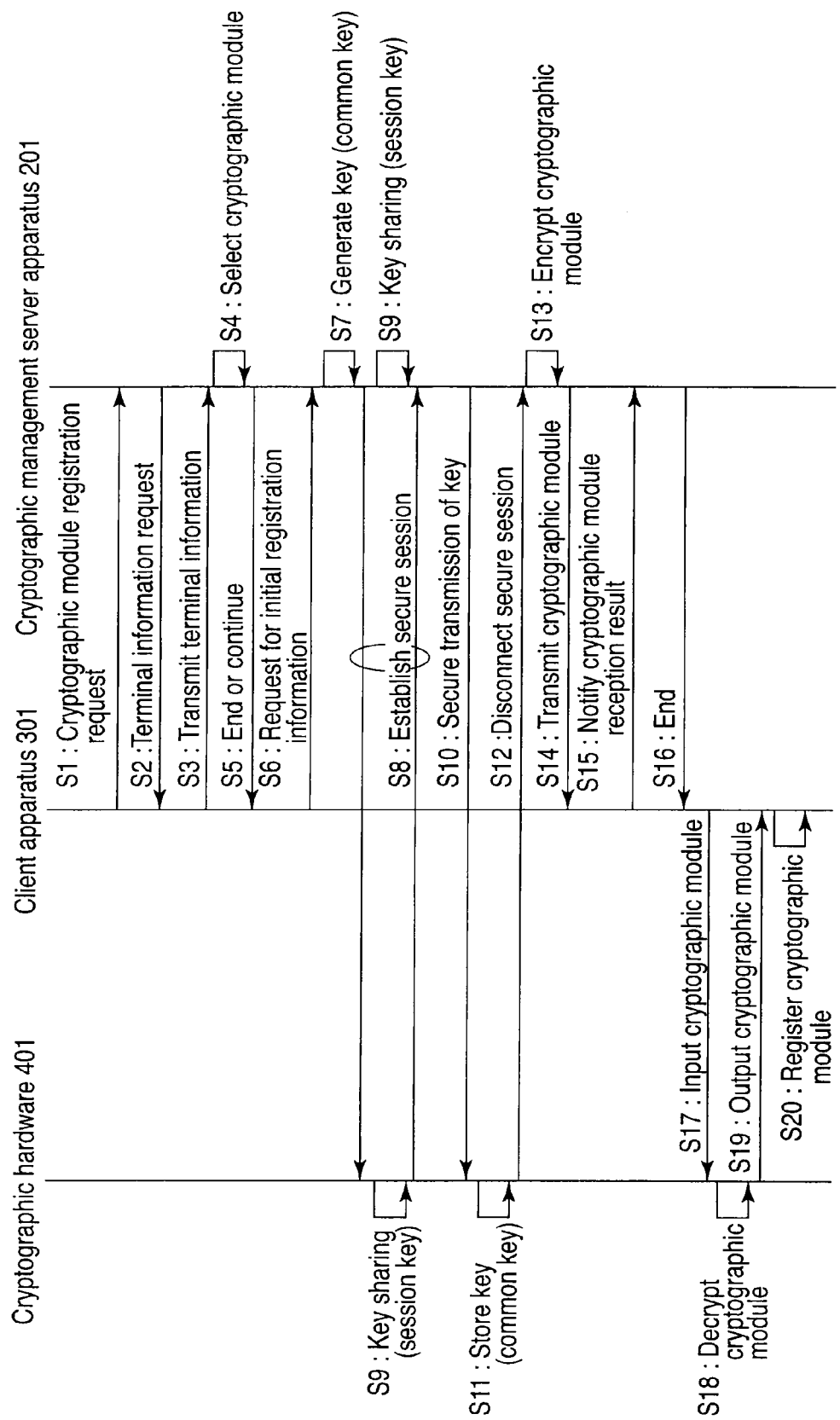
FIG. 5 is a sequence diagram illustrating an example of the operation of the cryptographic module distribution system according to the first embodiment.

FIG. 5 is a sequence diagram illustrating an example of the operation of the cryptographic module distribution system according to the first embodiment of the invention.

First, the communication function 302 of the client apparatus 301 transmits an initial cryptographic module registration request to the cryptographic management server apparatus 201 (Step S1). When the communication function 202 of the cryptographic management server apparatus 201 receives the initial cryptographic module registration request, it transmits a terminal information request to the client apparatus 301 (Step S2).

When the communication function 302 of the client apparatus 301 receives the transmitted terminal information request, the communication function 302 transmits the terminal information of the client apparatus 301 stored in the terminal information storage unit 304 to the cryptographic management server apparatus 201 (Step S3). When the communication function 202 of the cryptographic management server apparatus 201 receives the terminal information, the distributed cryptographic module selecting unit 203 stores a correspondence table between the identification information of each terminal and the identification information of a cryptographic module in advance, and selects and reads out a cryptographic module corresponding to the terminal identification information of the client apparatus 301, which has transmitted the request, as a cryptographic module that can be used by the client apparatus 301 from the cryptographic module DB 206, with reference to the correspondence table on the basis of the terminal identification information included in the received terminal information (Step S4). FIG. 6 shows an example of data for the correspondence table between the identification information of the terminal and the identification information of the cryptographic module. As shown in FIG. 6, for example, the identification information of the installed cryptographic module and the identification information of an installable cryptographic module are stored in the correspondence table so as to be associated with a terminal ID, which is the identification information of the terminal.

When the distributed cryptographic module selecting unit 203 selects a cryptographic module from the cryptographic module DB 206, the communication function 202 of the cryptographic management server apparatus 201 transmits information indicating the continuation of the process to the client apparatus 301. On the other hand, when the distributed cryptographic module selecting unit 203 cannot select a cryptographic module that can be used by the client apparatus 301, the communication function 202 transmits information indicating the end of the process to the client apparatus 301 (Step S5).

When the communication function 302 of the client apparatus 301 receives the information indicating the continuation of the process from the cryptographic management server apparatus 201, it transmits a request for initial registration information to the cryptographic management server apparatus 201 (Step S6). On the other hand, when the communication function 302 of the client apparatus 301 receives the information indicating the end of the process from the communication function 202 of the cryptographic management server apparatus 201, the communication between the client apparatus 301 and the cryptographic management server apparatus 201 ends.

When the communication function 202 of the cryptographic management server apparatus 201 receives the request for initial registration information, the key generating unit 204 generates a common key for encrypting the cryptographic module to be transmitted to the client apparatus 301 (Step S7). Then, the key sharing unit 205 of the cryptographic management server apparatus 201 shares a key with the key sharing unit 404 of the cryptographic hardware component 401 using a key sharing scheme. The key sharing scheme may be, for example, a Diffie-Hellman key exchange protocol.

The Diffie-Hellman key exchange protocol has been proposed in order to stably perform key exchange in a common key encryption system. That is, each of the key generating unit 204 of the cryptographic management server apparatus 201 and the key sharing unit 404 of the cryptographic hardware component 401 prepares a public key and a secret key, and opens the public key. Then, the key generating unit and the key sharing unit exchange data generated on the basis of their own secret keys, and generate a common key (hereinafter, referred to as a session key) on the basis of their own secret keys and the received data. The key sharing makes it possible to prevent a third party from generating a session key even if such third party intercepts the data, since the third party does not have the secret key.

When the key sharing unit 205 of the cryptographic management server apparatus 201 succeeds in generating the session key using the key sharing scheme, the cryptographic management server apparatus notifies the cryptographic hardware component 401 that a secure session has been established through the cryptographic hardware management control unit 305 of the client apparatus 301. Similarly, when the key sharing unit 404 of the cryptographic hardware component 401 succeeds in generating the session key, it notifies the cryptographic management server apparatus 201 that the secure session has been established (Steps S8 and S9). In this case, the key sharing unit 205 of the cryptographic management server apparatus 201 and the key sharing unit 404 of the cryptographic hardware component 401 communicate with each other through the secure session using the generated session key. For example, a transmitter side encrypts information and a receiver side decrypts information using the session key.

When a secure session is established between the cryptographic management server apparatus 201 and the cryptographic hardware component 401, the key sharing unit 205 of the cryptographic management server apparatus 201 uses the session key to encrypt the common key, and transmits the encrypted common key to the cryptographic hardware component 401 through the communication function 302 of the client apparatus 301 via the secure session (Step S10). When the cryptographic hardware component 401 receives the common key, the key sharing unit uses the session key to decrypt the received common key and the decrypted common key is stored in the key storage unit 403 (Step S11).

Upon acquisition of the common key, the cryptographic hardware component 401 transmits a secure session disconnection notice to the client apparatus 301 through the communication function 402 (Step S12). When the cryptographic management server apparatus 201 receives the secure session disconnection notice, the cryptographic module encrypting unit 207 encrypts the cryptographic module selected in Step S4 on the basis of the common key generated in Step S7 (Step S13). The communication function 202 of the cryptographic management server apparatus 201 transmits the encrypted cryptographic module to the client apparatus 301 (Step S14).

When the communication function 302 of the client apparatus 301 receives the encrypted cryptographic module, it transmits to the cryptographic management server apparatus 201 a cryptographic module reception result notice indicating that the cryptographic module has normally been received (Step S15). Then, when the communication function 202 of the cryptographic management server apparatus 201 receives the cryptographic module reception result notice, the communication function 202 of the cryptographic management server apparatus 201 transmits to the client apparatus 301 information indicating that an initial cryptographic module registration process has ended (Step S16).

In addition, when the communication function 302 of the client apparatus 301 does not receive the encrypted cryptographic module, the communication function 302 of the client apparatus 301 transmits to the cryptographic management server apparatus 201 a cryptographic module reception result notice indicating that the cryptographic module has not normally been received. Then, when the communication function 202 of the cryptographic management server apparatus 201 receives the cryptographic module reception result notice, the communication function 202 of the cryptographic management server apparatus 201 retransmits the cryptographic module. The number of times the communication function 202 retransmits the cryptographic module is larger than a predetermined value. When the cryptographic module is not normally received, it is considered that an error has occurred in the process, and the process ends.

When the communication function 302 of the client apparatus 301 receives information indicating that the initial cryptographic module registration process has ended, the cryptographic hardware management control unit 305 transmits to the cryptographic hardware component 401 the cryptographic module received from the cryptographic management server apparatus 201 (Step S17).

Then, when the communication function 402 of the cryptographic hardware component 401 receives the encrypted cryptographic module, the cryptographic module decrypting unit 405 reads out the common key stored in the key storage unit 403, uses the common key to decrypt the cryptographic module (Step S18), and transmits the decrypted cryptographic module to the cryptographic management server apparatus 201 through the communication function 402 (Step S19). When the cryptographic hardware management control unit 305 of the client apparatus 301 receives the cryptographic module, it implements the cryptographic module in the cryptographic module implementation unit 306 such that the cryptographic module is available. In addition, the cryptographic hardware management control unit stores the cryptographic module stored in the cryptographic module implementation unit 306 in the cryptographic module DB 303 (Step S20).

Second Embodiment

Next, the operation of a cryptographic module distribution system distributing a key according to a second embodiment of the invention will be described. In the first embodiment, the encrypted cryptographic module is distributed. However, in the second embodiment, the cryptographic module is not encrypted, but a MAC whose integrity can be validated is added to the cryptographic module. The MAC is a message authentication code, and is, for example, a MAC value that is calculated by a combination of a MAC key, which is a secret key, and a hash function. A receiver that acquires a message and the MAC calculates the MAC value from the message to check that a transmitter has the secret key or to verify whether or not an illegal act, such as tampering, is performed while the message is transmitted.

The structure of the cryptographic module distribution system according to the second embodiment is the same as that according to the first embodiment. In the second embodiment, a description of the same structure and process as those in the first embodiment will be omitted. Next, only the structure and processes peculiar to the second embodiment will be described.

Figure 7:
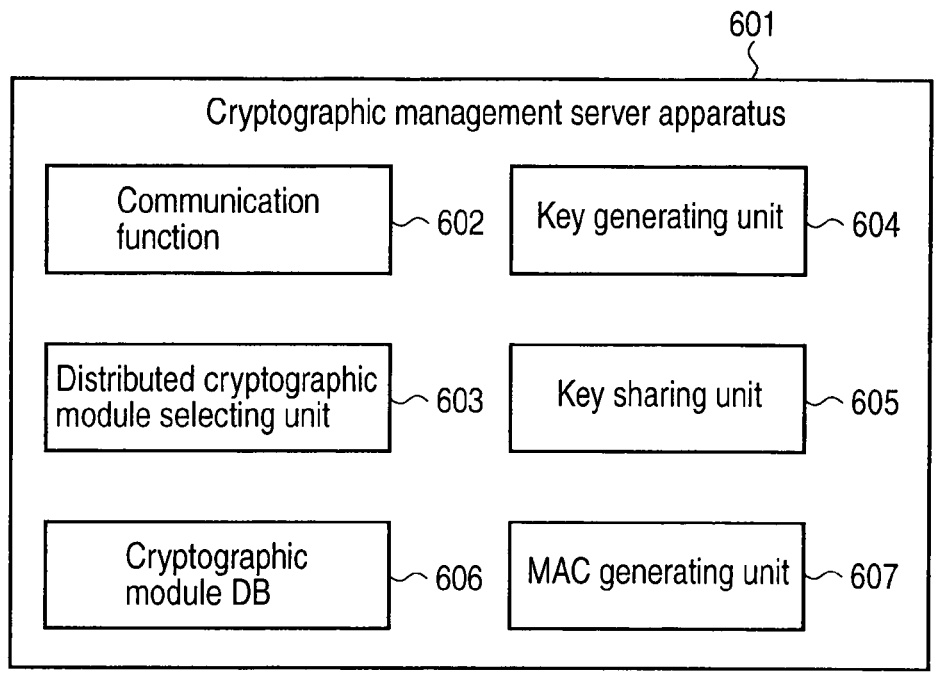
FIG. 7 is a block diagram illustrating the structure of a cryptographic management server apparatus according to a second embodiment of the invention.

FIG. 7 is a block diagram illustrating the structure of a cryptographic management server apparatus according to the second embodiment of the invention. A cryptographic management server apparatus 601 includes a communication function 602, a distributed cryptographic module selecting unit 603, a key generating unit 604, a key sharing unit 605, a cryptographic module DB 606, and a MAC generating unit 607. The cryptographic management server apparatus 601 corresponds to the cryptographic management server apparatus 101 shown in FIG. 1. The MAC generating unit 607 adds a MAC using a key generated by the key generating unit 604 to a cryptographic module to be transmitted to a cryptographic hardware component 701.

The structure of a client apparatus 301 is the same as that in the first embodiment.

Figure 8:
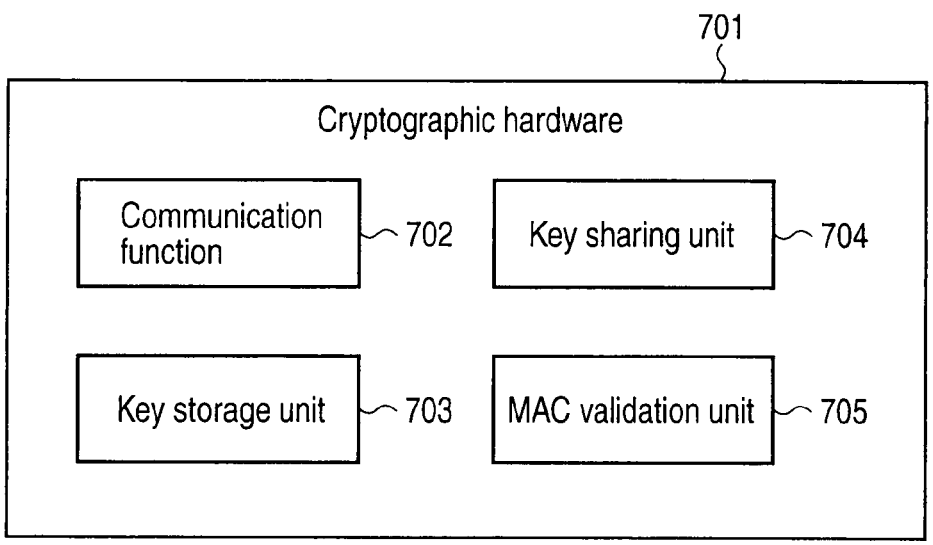
FIG. 8 is a block diagram illustrating the structure of a cryptographic hardware component according to the second embodiment.

FIG. 8 is a block diagram illustrating the structure of the cryptographic hardware component according to the second embodiment of the invention. The cryptographic hardware component 701 includes a communication function 702, a key storage unit 703, a key sharing unit 704, and a MAC validation unit 705. The cryptographic hardware component 701 corresponds to the cryptographic hardware component 103 shown in FIG. 1.

The MAC validation unit 705 uses the MAC key stored in the key storage unit 703 to validate the MAC of the received data (cryptographic module).

Next, an example of the operation of the second embodiment of the invention will be described.

Figure 9:
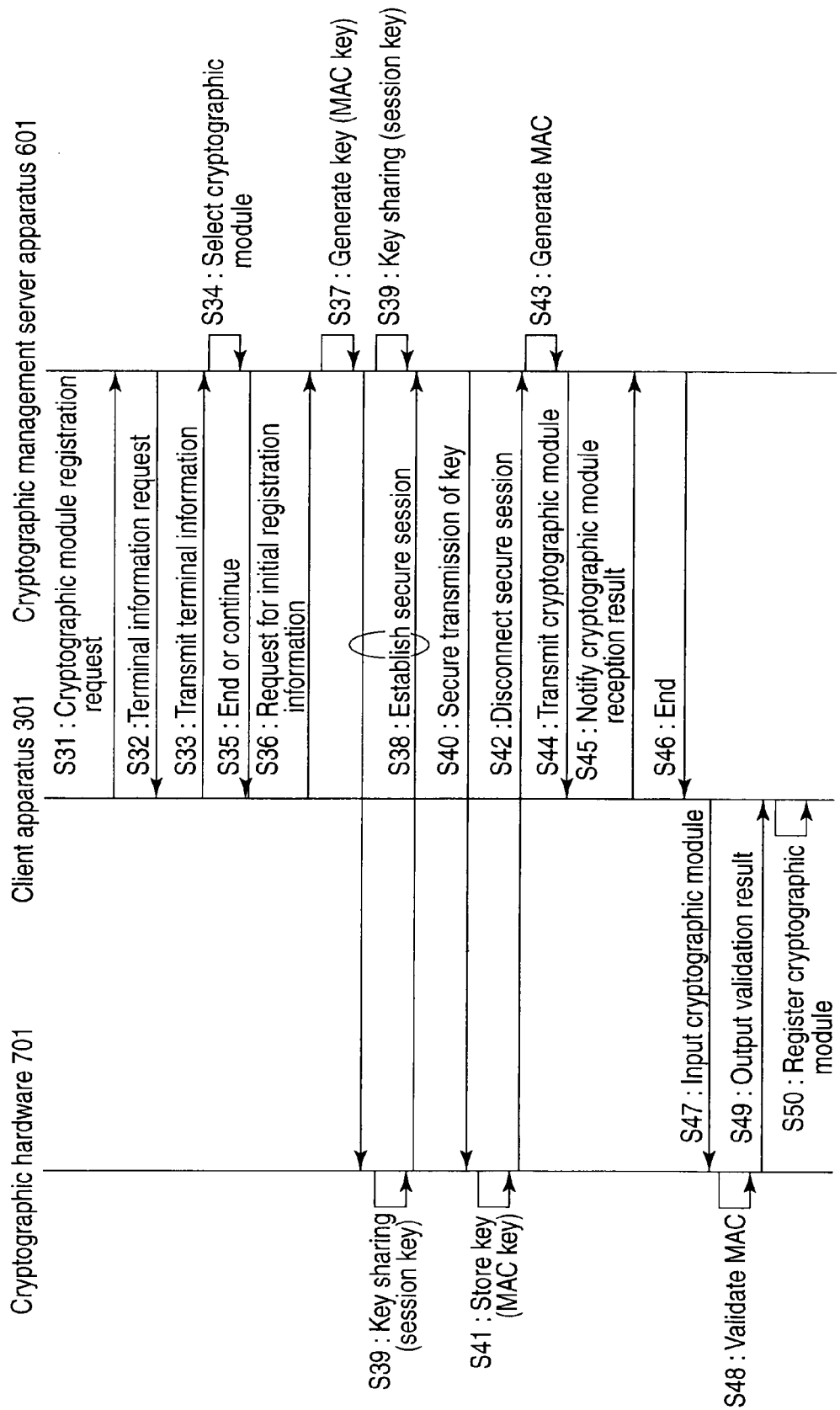
FIG. 9 is a sequence diagram illustrating an example of the operation of a cryptographic module distribution system according to the second embodiment.

FIG. 9 is a sequence diagram illustrating an example of the operation of the cryptographic module distribution system according to the second embodiment of the invention.

First, the communication function 302 of the client apparatus 301 transmits an initial cryptographic module registration request to the cryptographic management server apparatus 601 (Step S31). When the communication function 602 of the cryptographic management server apparatus 601 receives the initial cryptographic module registration request, it transmits a terminal information request to the client apparatus 301 (Step S32).

When the communication function 302 of the client apparatus 301 receives the transmitted terminal information request, the communication function 302 transmits the terminal information of the client apparatus 301 stored in the terminal information storage unit 304 to the cryptographic management server apparatus 601 (Step S33). When the communication function 602 of the cryptographic management server apparatus 601 receives the terminal information, the distributed cryptographic module selecting unit 603 stores a correspondence table between the identification information of each terminal and the identification information of a cryptographic module in advance, and selects and reads out a cryptographic module corresponding to the terminal identification information of the client apparatus 301, which has transmitted the request, as a cryptographic module that can be used by the client apparatus 301 from the cryptographic module DB 606, with reference to the correspondence table on the basis of the terminal identification information included in the received terminal information (Step S34).

When the distributed cryptographic module selecting unit 603 selects a cryptographic module from the cryptographic module DB 606, the communication function 602 of the cryptographic management server apparatus 601 transmits information indicating the continuation of the process to the client apparatus 301. On the other hand, when the distributed cryptographic module selecting unit 603 cannot select a cryptographic module that can be used by the client apparatus 301, the communication function 602 transmits information indicating the end of the process to the client apparatus 301 (Step S35).

When the communication function 302 of the client apparatus 301 receives the information indicating the continuation of the process from the cryptographic management server apparatus 601, it transmits a request for initial registration information to the cryptographic management server apparatus 601 (Step S36). On the other hand, when the communication function 302 of the client apparatus 301 receives the information indicating the end of the process from the communication function 602 of the cryptographic management server apparatus 601, the communication between the client apparatus 301 and the cryptographic management server apparatus 601 ends.

When the communication function 602 of the cryptographic management server apparatus 601 receives the request for initial registration information, the key generating unit 604 generates a MAC key for adding a MAC to the cryptographic module to be transmitted to the client apparatus 301 (Step S37). Then, the key sharing unit 605 of the cryptographic management server apparatus 601 shares a key with the key sharing unit 704 of the cryptographic hardware component 701 using a key sharing scheme. The key sharing scheme may be, for example, a Diffie-Hellman key exchange protocol.

When the key sharing unit 605 of the cryptographic management server apparatus 601 succeeds in generating a session key using the key sharing scheme, the cryptographic management server apparatus notifies the cryptographic hardware component 701 that a secure session has been established through the cryptographic hardware management control unit 305 of the client apparatus 301. Similarly, when the key sharing unit 704 of the cryptographic hardware component 701 succeeds in generating the session key, the cryptographic hardware component notifies the cryptographic management server apparatus 601 that the secure session has been established (Steps S38 and S39). In this case, the key sharing unit 605 of the cryptographic management server apparatus 601 and the key sharing unit 704 of the cryptographic hardware component 701 communicate with each other through the secure session using the generated session key. For example, a transmitter side encrypts information and a receiver side decrypts the information using the session key.

When a secure session is established between the cryptographic management server apparatus 601 and the cryptographic hardware component 701, the key sharing unit 605 of the cryptographic management server apparatus 601 uses the session key to encrypt the MAC key, and transmits the encrypted MAC key to the cryptographic hardware component 701 through the communication function 302 of the client apparatus 301 via the secure session (Step S40). When the cryptographic hardware component 701 receives the MAC key, the key sharing unit uses the session key to decrypt the MAC key and the decrypted MAC key is stored in the key storage unit 703 (Step S41).

Upon acquisition of the MAC key, the cryptographic hardware component 701 transmits a secure session disconnection notice to the client apparatus 301 through the communication function 702 (Step S42). When the cryptographic management server apparatus 601 receives the secure session disconnection notice, the MAC generating unit 607 calculates the MAC (value) from the cryptographic module selected in Step S34 on the basis of the MAC key generated in Step S37 (Step S43). The communication function 602 of the cryptographic management server apparatus 601 transmits the cryptographic module and the calculated MAC to the client apparatus 301 (Step S44).

When the communication function 302 of the client apparatus 301 receives the cryptographic module and the MAC, the communication function transmits to the cryptographic management server apparatus 601 a cryptographic module reception result notice indicating that the cryptographic module has normally been received (Step S45). Then, when the communication function 602 of the cryptographic management server apparatus 601 receives the cryptographic module reception result notice, the communication function 602 of the cryptographic management server apparatus 601 transmits to the client apparatus 301 information indicating that an initial cryptographic module registration process has ended (Step S46).

In addition, when the communication function 302 of the client apparatus 301 does not receive the encrypted cryptographic module and the MAC, the communication function 302 of the client apparatus 301 transmits to the cryptographic management server apparatus 601 a cryptographic module reception result notice indicating that the cryptographic module and the MAC have not normally been received. Then, when the communication function 602 of the cryptographic management server apparatus 601 receives the cryptographic module reception result notice, the communication function 602 of the cryptographic management server apparatus 601 retransmits the cryptographic module. The number of times the communication function 602 retransmits the cryptographic module and the MAC is larger than a predetermined value. When the cryptographic module and the MAC are not normally received, it is considered that an error has occurred in the process, and the process ends.

When the communication function 302 of the client apparatus 301 receives information indicating that the initial cryptographic module registration process has ended, the cryptographic hardware management control unit 305 transmits to the cryptographic hardware component 701 the cryptographic module and the MAC received from the cryptographic management server apparatus 601 (Step S47).

Then, when the communication function 702 of the cryptographic hardware component 701 receives the cryptographic module and the MAC, the MAC validation unit 705 reads out the MAC key stored in the key storage unit 703, and uses the MAC key to validate the MAC (Step S48). That is, the MAC validation unit 705 generates a validation result indicating that the MAC is valid when the MAC is calculated on the basis of the cryptographic module and MAC key, and generates a validation result indicating that the MAC is invalid when the MAC is not calculated on the basis of the cryptographic module and the MAC key.

The MAC validation unit 705 transmits the validation result to the cryptographic management server apparatus 601 through the communication function 702 (Step S49). When the cryptographic hardware management control unit 305 of the client apparatus 301 receives the validation result indicating that the MAC is valid, it implements the received cryptographic module in the cryptographic module implementation unit 306 such that the cryptographic module is available. In addition, the cryptographic hardware management control unit stores the cryptographic module stored in the cryptographic module implementation unit 306 in the cryptographic module DB 303 (Step S50). Upon receiving the validation result indicating that the MAC is invalid, the cryptographic hardware management control unit 305 determines that an error has occurred and ends the process.

Third Embodiment

Next, the operation of a cryptographic module distribution system distributing a key according to a third embodiment of the invention will be described. In the third embodiment, a cryptographic module to be distributed is encrypted with a common key and then a MAC is added to the encrypted cryptographic module.

The structure of the cryptographic module distribution system according to the third embodiment is the same as those in the first and second embodiments, and a description of the same structure and process as those in the first and second embodiments will be omitted. Next, only the structure and process peculiar to the third embodiment will be described.

Figure 10:
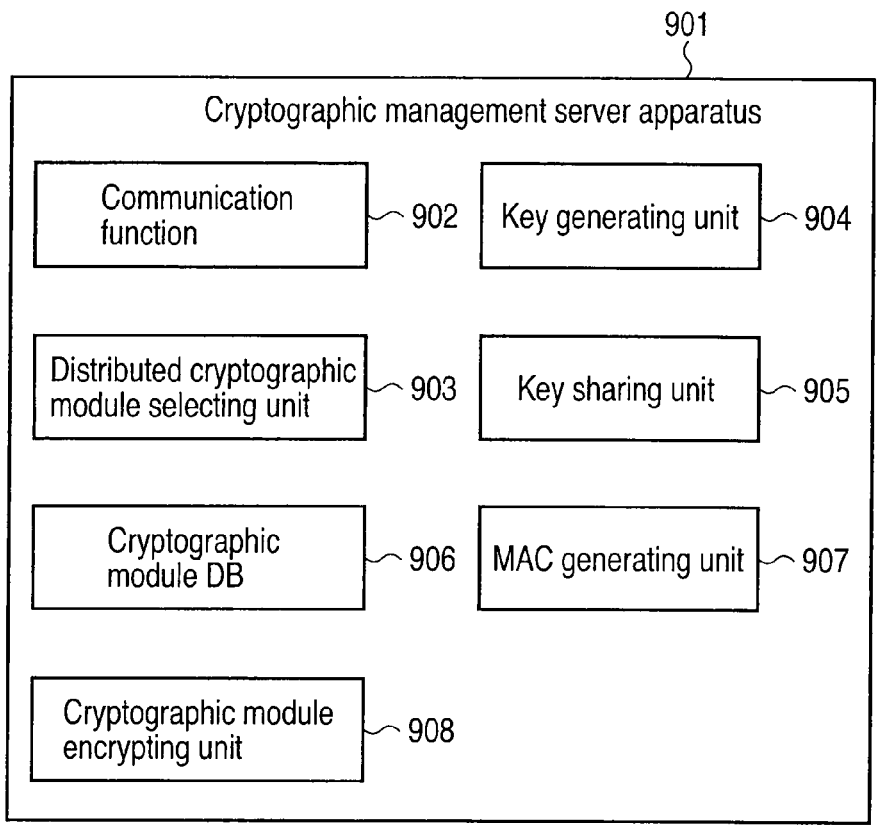
FIG. 10 is a block diagram illustrating the structure of a cryptographic management server apparatus according to a third embodiment of the invention.

FIG. 10 is a block diagram illustrating the structure of a cryptographic management server apparatus according to the third embodiment of the invention. A cryptographic management server apparatus 901 includes a communication function 902, a distributed cryptographic module selecting unit 903, a key generating unit 904, a key sharing unit 905, a cryptographic module DB 906, a MAC generating unit 907, and a cryptographic module encrypting unit 908. The cryptographic management server apparatus 901 corresponds to the cryptographic management server apparatus 101 shown in FIG. 1.

The structure of a client apparatus 301 is the same as that in the first embodiment.

Figure 11:
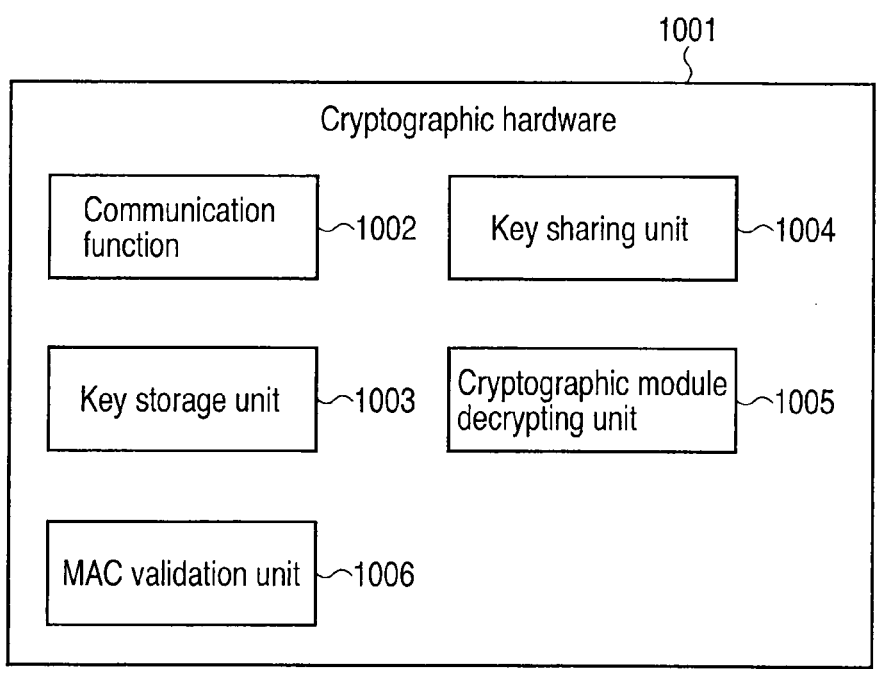
FIG. 11 is a block diagram illustrating the structure of a cryptographic hardware component according to the third embodiment.

FIG. 11 is a block diagram illustrating the structure of a cryptographic hardware component according to the third embodiment of the invention. A cryptographic hardware component 1001 includes a communication function 1002, a key storage unit 1003, a key sharing unit 1004, a cryptographic module decrypting unit 1005, and a MAC validation unit 1006. The cryptographic hardware component 1001 corresponds to the cryptographic hardware component 103 shown in FIG. 1.

Next, an example of the operation of the third embodiment of the invention will be described.

Figure 12:
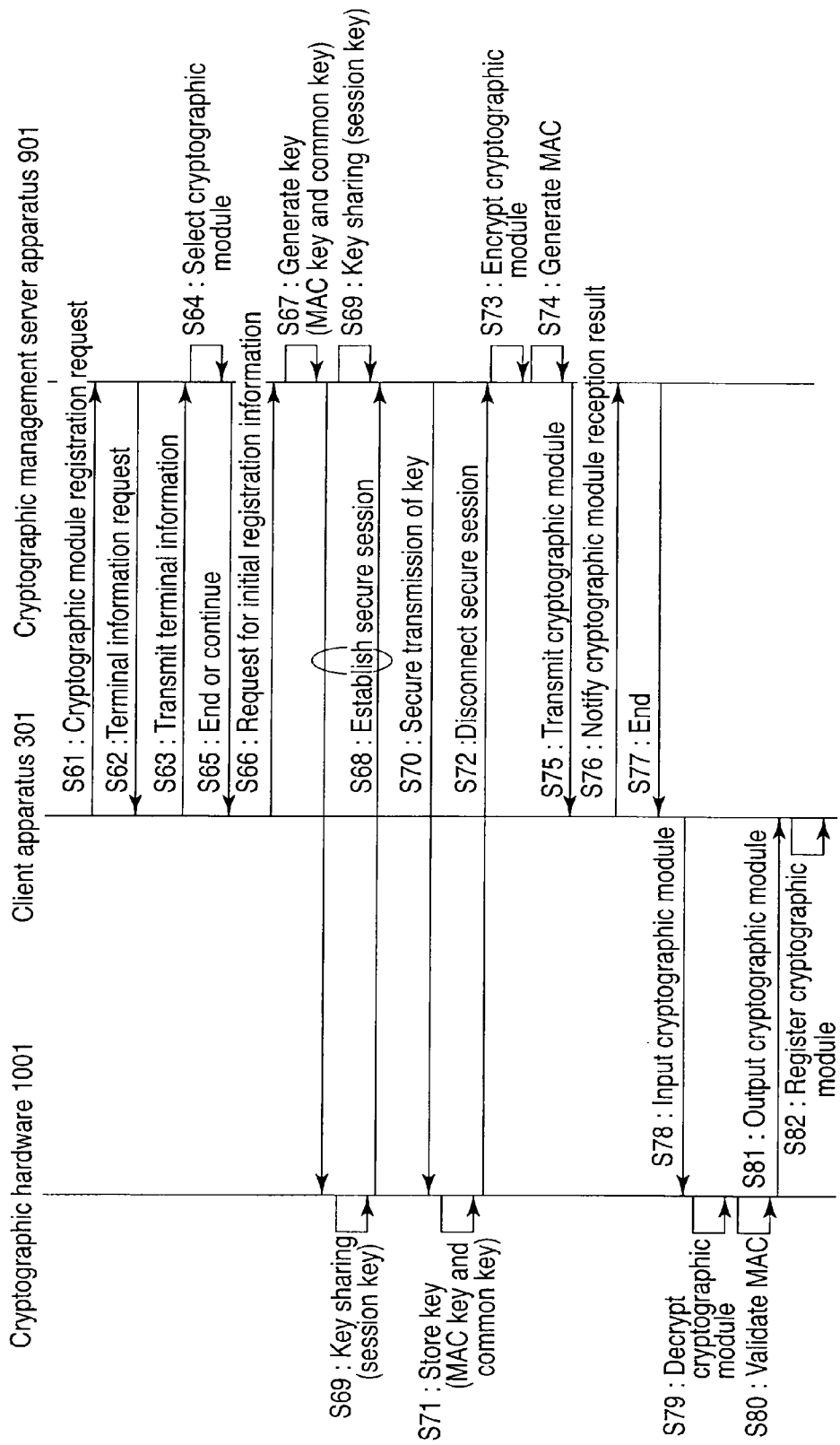
FIG. 12 is a sequence diagram illustrating an example of the operation of a cryptographic module distribution system according to the third embodiment.

FIG. 12 is a sequence diagram illustrating an example of the operation of the cryptographic module distribution system according to the third embodiment of the invention.

First, the communication function 302 of the client apparatus 301 transmits an initial cryptographic module registration request to the cryptographic management server apparatus 901 (Step S61). When the communication function 902 of the cryptographic management server apparatus 901 receives the initial cryptographic module registration request, the cryptographic management server apparatus 901 transmits a terminal information request to the client apparatus 301 through the communication function 902 (Step S62).

When the communication function 302 of the client apparatus 301 receives the terminal information request, the communication function 302 transmits the terminal information of the client apparatus 301 stored in the terminal information storage unit 304 to the cryptographic management server apparatus 901 (Step S63). When the communication function 902 of the cryptographic management server apparatus 901 receives the terminal information, the distributed cryptographic module selecting unit 903 stores a correspondence table between the identification information of each terminal and the identification information of a cryptographic module in advance, and selects and reads out a cryptographic module corresponding to the terminal identification information of the client apparatus 301, which has transmitted the request, as a cryptographic module that can be used by the client apparatus 301 from the cryptographic module DB 906, with reference to the correspondence table on the basis of the terminal identification information included in the received terminal information (Step S64).

When the distributed cryptographic module selecting unit 903 selects a cryptographic module from the cryptographic module DB 906, the communication function 902 of the cryptographic management server apparatus 901 transmits information indicating the continuation of the process to the client apparatus 301. On the other hand, when the distributed cryptographic module selecting unit 903 cannot select a cryptographic module that can be used by the client apparatus 301, the cryptographic management server apparatus 901 transmits information indicating the end of the process to the client apparatus 301 through the communication function 902 (Step S65).

When the communication function 302 of the client apparatus 301 receives the information indicating the continuation of the process from the cryptographic management server apparatus 901, the client apparatus transmits a request for initial registration information to the cryptographic management server apparatus 901 (Step S66). On the other hand, when the communication function 302 of the client apparatus 301 receives the information indicating the end of the process from the communication function 902 of the cryptographic management server apparatus 901, the communication between the client apparatus 301 and the cryptographic management server apparatus 901 ends.

When the communication function 902 of the cryptographic management server apparatus 901 receives the request for initial registration information, the key generating unit 904 generates a common key for encrypting the cryptographic module to be transmitted to the client apparatus 301 and a MAC key for adding a MAC to the cryptographic module (Step S67). Here, the common key for encrypting the cryptographic module may be identical to the MAC key for generating the MAC. Then, the key sharing unit 905 of the cryptographic management server apparatus 901 shares a key with the key sharing unit 1004 of the cryptographic hardware component 1001 using a key sharing scheme. The key sharing scheme may be, for example, a Diffie-Hellman key exchange protocol.

When the key sharing unit 905 of the cryptographic management server apparatus 901 succeeds in generating a session key using the key sharing scheme, the cryptographic management server apparatus notifies the cryptographic hardware component 1001 that the secure session has been established through the cryptographic hardware management control unit 305 of the client apparatus 301. Similarly, when the key sharing unit 1004 of the cryptographic hardware component 1001 succeeds in generating the session key, the cryptographic hardware component notifies the cryptographic management server apparatus 901 that the secure session has been established (Steps S68 and S69). In this case, the key sharing unit 905 of the cryptographic management server apparatus 901 and the key sharing unit 1004 of the cryptographic hardware component 1001 communicate with each other through the secure session using the generated session key. For example, a transmitter side encrypts information and a receiver side decrypts the information using the session key.

When a secure session is established between the cryptographic management server apparatus 901 and the cryptographic hardware component 1001, the key sharing unit 905 of the cryptographic management server apparatus 901 uses the session key to encrypt the common key and the MAC key, and transmits the encrypted common key and MAC key to the cryptographic hardware component 1001 through the communication function 302 of the client apparatus 301 via the secure session (Step S70). When the cryptographic hardware component 1001 receives the common key and the MAC key, the key sharing unit uses the session key to decrypt the common key and the MAC key and the decrypted common key and MAC key are stored in the key storage unit 1003 (Step S71).

Upon acquisition of the common key and the MAC key, the cryptographic hardware component 1001 transmits a secure session disconnection notice to the client apparatus 301 through the communication function 1002 (Step S72). The cryptographic management server apparatus 901 receives a secure session disconnection notice. Then, the cryptographic module encrypting unit 908 encrypts the cryptographic module on the basis of the common key generated in Step S67 (Step S73). In addition, the MAC generating unit 907 calculates the MAC (value) of the cryptographic module on the basis of the MAC key generated in Step S67 (Step S74). In this case, after the MAC of the cryptographic module is calculated, the cryptographic module and the MAC may be combined with each other, the combined information may be encrypted on the basis of the common key generated in Step S67, and the encrypted information may be transmitted to the client apparatus 301. The communication function 902 of the cryptographic management server apparatus 901 transmits the encrypted cryptographic module and the calculated MAC to the client apparatus 301 (Step S75).

When the communication function 302 of the client apparatus 301 receives the encrypted cryptographic module and the MAC, the communication function transmits to the cryptographic management server apparatus 901 a cryptographic module reception result notice indicating that the encrypted cryptographic module and the MAC have normally been received (Step S76). Then, when the communication function 902 of the cryptographic management server apparatus 901 receives the cryptographic module reception result notice, the communication function 902 of the cryptographic management server apparatus 901 transmits to the client apparatus 301 information indicating that an initial cryptographic module registration process has ended (Step S77).

In addition, when the communication function 302 of the client apparatus 301 does not receive the encrypted cryptographic module and the MAC, the communication function 302 of the client apparatus 301 transmits to the cryptographic management server apparatus 901 a cryptographic module reception result notice indicating that the cryptographic module and the MAC have not normally been received. Then, when the communication function 902 of the cryptographic management server apparatus 901 receives the cryptographic module reception result notice, the communication function 902 of the cryptographic management server apparatus 901 retransmits the encrypted cryptographic module and the MAC. The number of times the communication function 902 retransmits the cryptographic module and the MAC is larger than a predetermined value. When the encrypted cryptographic module and the MAC are not normally received, it is considered that an error has occurred in the process, and the process ends.

When the communication function 302 of the client apparatus 301 receives information indicating that the initial cryptographic module registration process has ended, the cryptographic hardware management control unit 305 transmits to the cryptographic hardware component 1001 the encrypted cryptographic module and the MAC received from the cryptographic management server apparatus 901 (Step S78).

Then, when the communication function 1002 of the cryptographic hardware component 1001 receives the encrypted cryptographic module and the MAC, the cryptographic module decrypting unit 1005 reads out the common key stored in the key storage unit 1003 and uses the common key to decrypt the encrypted cryptographic module (Step S79). In addition, the MAC validation unit 1006 reads out the MAC key stored in the key storage unit 1003, and uses the MAC key to validate the MAC (Step S80) to generate a validation result.

The communication function 1002 transmits the decrypted cryptographic module and the validation result to the cryptographic management server apparatus 901 (Step S81). When the cryptographic hardware management control unit 305 of the client apparatus 301 receives the cryptographic module and the validation result indicating that the MAC is valid, it implements the received cryptographic module in the cryptographic module implementation unit 306 such that the cryptographic module is available. In addition, the cryptographic hardware management control unit stores the cryptographic module stored in the cryptographic module implementation unit 306 in the cryptographic module DB 303 (Step S82). Upon receiving the validation result indicating that the MAC is invalid, the cryptographic hardware management control unit 305 determines that an error has occurred and ends the process.

Fourth Embodiment

Next, the operation of a cryptographic module distribution system distributing a key according to a fourth embodiment of the invention will be described.

Figure 13:
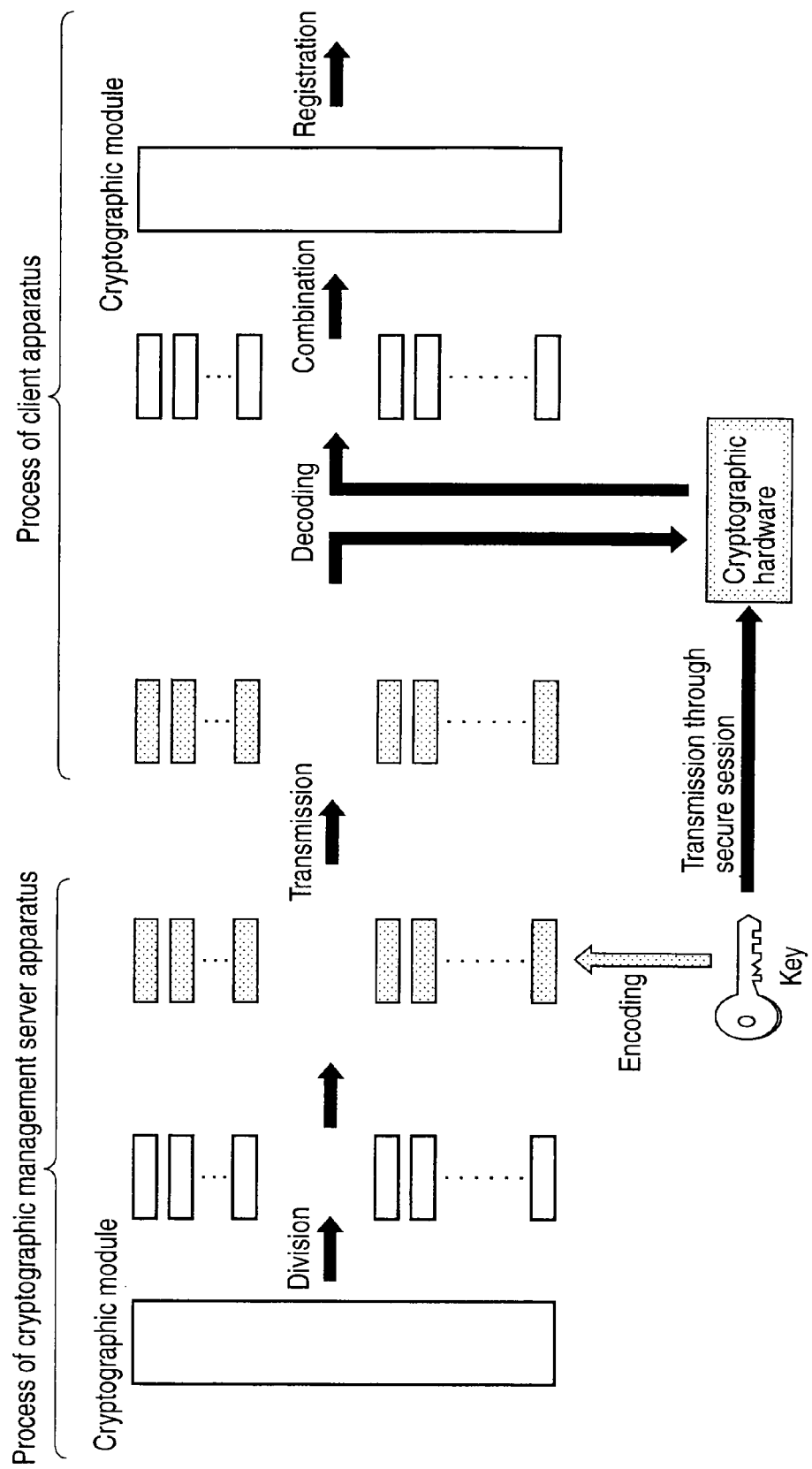
FIG. 13 is a conceptual diagram illustrating an example of the operation of a cryptographic module distribution system according to a fourth embodiment of the invention.

In the first to third embodiments, all the cryptographic modules to be distributed are encrypted as one file or a MAC is added thereto. However, the cryptographic hardware component may not process a large amount of data due to restrictions in the processing capability of a cryptographic hardware component. Therefore, the cryptographic module is divided into a predetermined size for transmission. That is, as shown in FIG. 13, a cryptographic management server apparatus divides the cryptographic module into a predetermined size, uses a key to encrypt the divided cryptographic modules, and transmits them to a client apparatus. The client apparatus sequentially decrypts the divided cryptographic modules with a cryptographic hardware component, and combines the decrypted cryptographic modules. In this way, it is possible to reduce the amount of data decrypted by the cryptographic hardware component at one time.

In the fourth embodiment, an example of the operation of the cryptographic module distribution system dividing a cryptographic module into a predetermined size and transmitting the divided cryptographic modules will be described, in addition to the first embodiment. That is, a cryptographic module to be distributed is encrypted with a common key, and then the cryptographic module is divided. The structure of the cryptographic module distribution system according to the fourth embodiment is the same as that according to the first embodiment, and a description of the same structure and process will be omitted. Hereinafter, only the structure and process peculiar to the fourth embodiment will be described.

Figure 14:
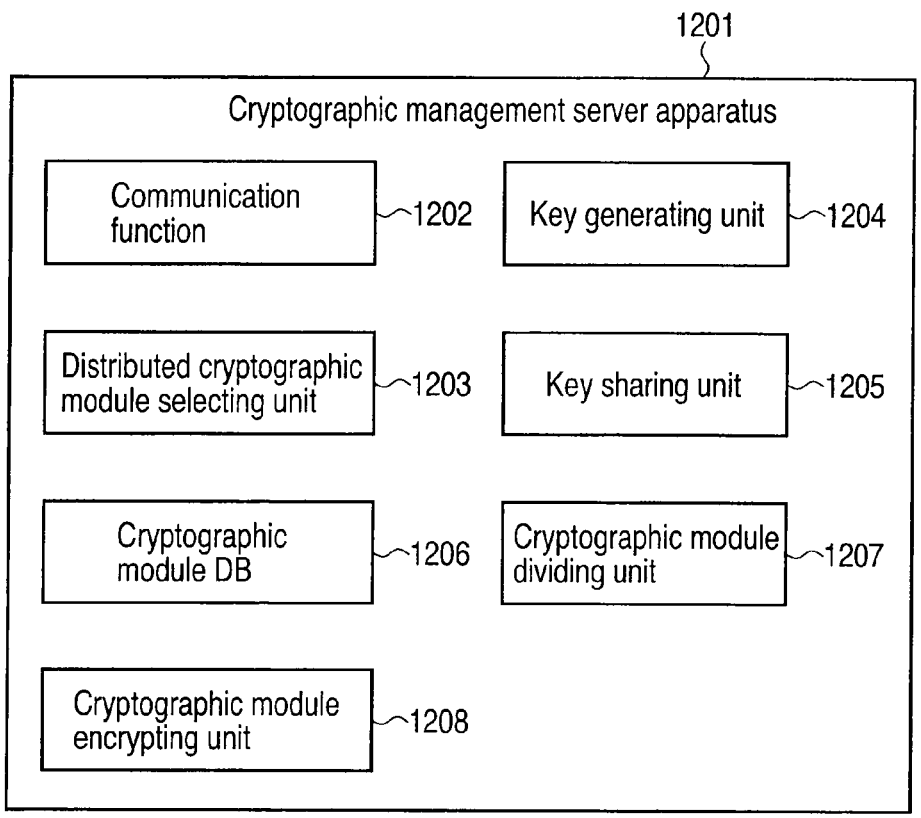
FIG. 14 is a block diagram illustrating the structure of a cryptographic management server apparatus according to the fourth embodiment.

FIG. 14 is a block diagram illustrating the structure of a cryptographic management server apparatus according to the fourth embodiment of the invention. A cryptographic management server apparatus 1201 includes a communication function 1202, a distributed cryptographic module selecting unit 1203, a key generating unit 1204, a key sharing unit 1205, a cryptographic module DB 1206, a cryptographic module dividing unit 1207, and a cryptographic module encrypting unit 1208. The cryptographic management server apparatus 1201 corresponds to the cryptographic management server apparatus 101 shown in FIG. 1.

Figure 15:
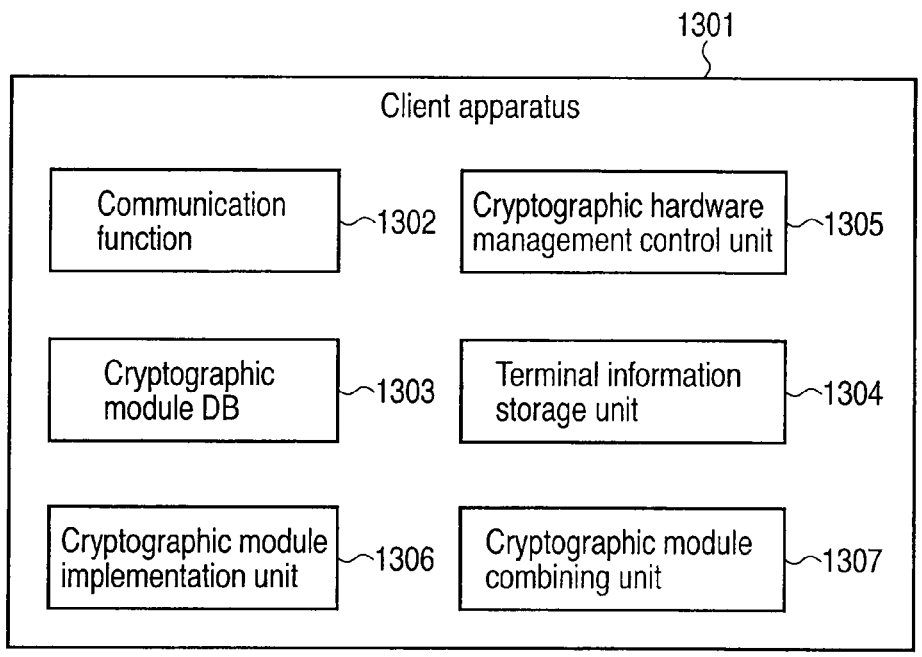
FIG. 15 is a block diagram illustrating the structure of a client apparatus according to the fourth embodiment.

FIG. 15 is a block diagram illustrating the structure of a client apparatus according to the fourth embodiment of the invention. A client apparatus 1301 includes a communication function 1302, a terminal information storage unit 1304, a cryptographic hardware management control unit 1305, a cryptographic module implementation unit 1306, and a cryptographic module combining unit 1307. The client apparatus 1301 corresponds to the client apparatus 102 shown in FIG. 1.

The structure of a cryptographic hardware component 401 is the same as that in the first embodiment.

Next, an example of the operation of the fourth embodiment will be described with reference to FIG. 16.

Figure 16:
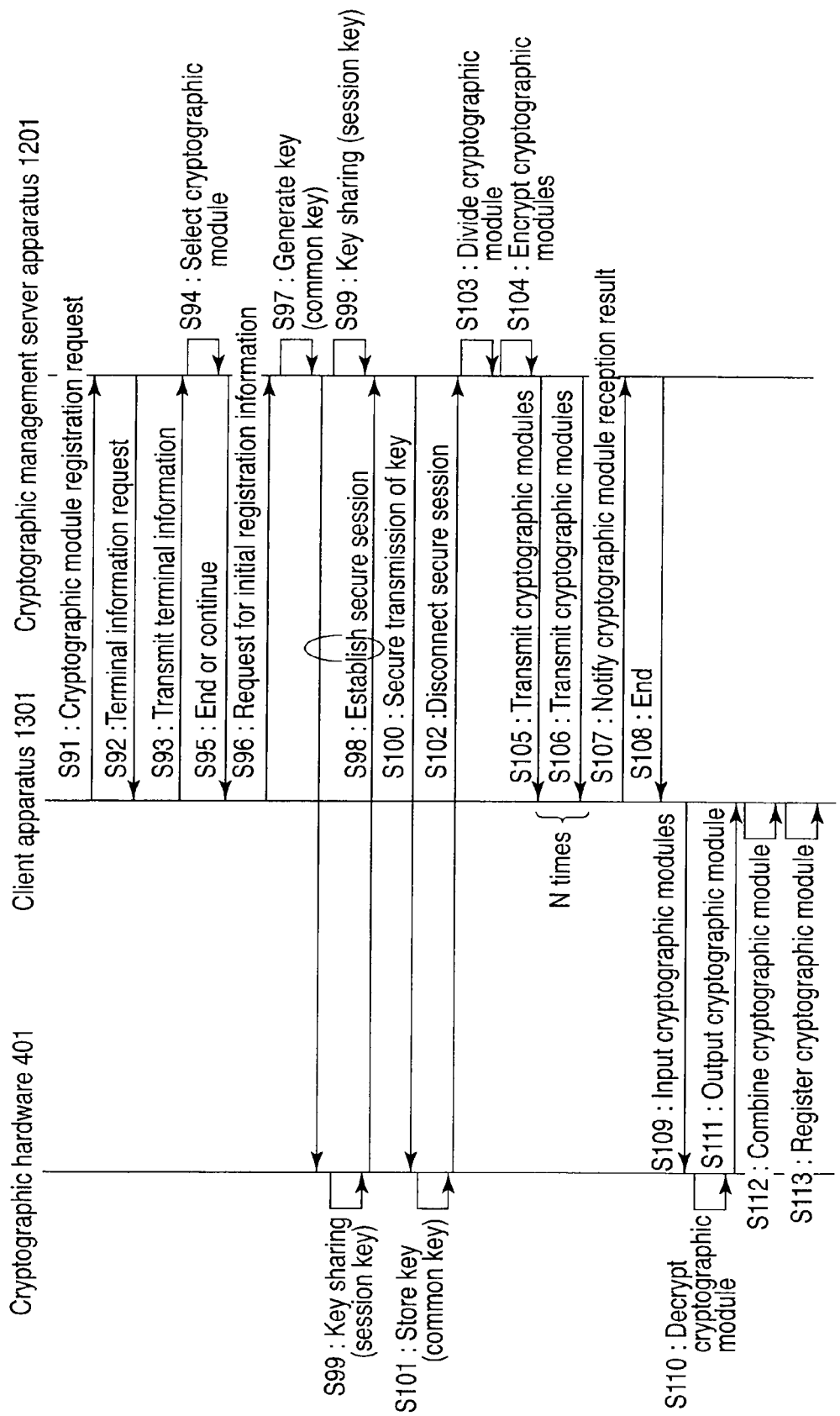
FIG. 16 is a sequence diagram illustrating an example of the operation of the cryptographic module distribution system according to the fourth embodiment.

FIG. 16 is a sequence diagram illustrating an example of the operation of the cryptographic module distribution system according to the fourth embodiment of the invention.

First, the communication function 1302 of the client apparatus 1301 transmits an initial cryptographic module registration request to the cryptographic management server apparatus 1201 (Step S91). When the communication function 1202 of the cryptographic management server apparatus 1201 receives the initial cryptographic module registration request, it transmits a terminal information request to the client apparatus 1301 (Step S92).

When the communication function 1302 of the client apparatus 1301 receives the transmitted terminal information request, the communication function 1302 transmits the terminal information of the client apparatus 1301 stored in the terminal information storage unit 1304 to the cryptographic management server apparatus 1201 (Step S93). When the communication function 1202 of the cryptographic management server apparatus 1201 receives the terminal information, the distributed cryptographic module selecting unit 1203 stores a correspondence table between the identification information of each terminal and the identification information of a cryptographic module in advance, and selects and reads out a cryptographic module corresponding to the terminal identification information of the client apparatus 1301, which has transmitted the request, as a cryptographic module that can be used by the client apparatus 1301 from the cryptographic module DB 1206, with reference to the correspondence table on the basis of the terminal identification information included in the received terminal information (Step S94).

When the distributed cryptographic module selecting unit 1203 selects a cryptographic module from the cryptographic module DB 1206, the communication function 1202 of the cryptographic management server apparatus 1201 transmits information indicating the continuation of the process to the client apparatus 1301. On the other hand, when the distributed cryptographic module selecting unit 1203 cannot select a cryptographic module that can be used by the client apparatus 1301, the communication function 1202 transmits information indicating the end of the process to the client apparatus 1301 (Step S95).

When the communication function 1302 of the client apparatus 1301 receives the information indicating the continuation of the process from the cryptographic management server apparatus 1201, it transmits a request for initial registration information to the cryptographic management server apparatus 1201 (Step S96). On the other hand, when the communication function 1302 of the client apparatus 1301 receives the information indicating the end of the process from the communication function 1202 of the cryptographic management server apparatus 1201, the communication between the client apparatus 1301 and the cryptographic management server apparatus 1201 ends.

When the communication function 1202 of the cryptographic management server apparatus 1201 receives the request for initial registration information, the key generating unit 1204 generates a common key for encrypting the cryptographic module to be transmitted to the client apparatus 1301 (Step S97). In this case, the key generating unit 1204 may generate a plurality of common keys for encrypting the cryptographic module. Then, the key sharing unit 1205 of the cryptographic management server apparatus 1201 shares a key with the key sharing unit 404 of the cryptographic hardware component 401 using a key sharing scheme. The key sharing scheme may be, for example, a Diffie-Hellman key exchange protocol.

When the key sharing unit 1205 of the cryptographic management server apparatus 1201 succeeds in generating a session key using the key sharing scheme, the cryptographic management server apparatus notifies the cryptographic hardware component 401 that the secure session has been established through the cryptographic hardware management control unit 1305 of the client apparatus 1301. Similarly, when the key sharing unit 404 of the cryptographic hardware component 401 succeeds in generating the session key, the cryptographic hardware component notifies the cryptographic management server apparatus 1201 that the secure session has been established (Steps S98 and S99). In this case, the key sharing unit 1205 of the cryptographic management server apparatus 1201 and the key sharing unit 404 of the cryptographic hardware component 401 communicate with each other through the secure session using the generated session key. For example, a transmitter side encrypts information and a receiver side decrypts the information using the session key.

When a secure session is established between the cryptographic management server apparatus 1201 and the cryptographic hardware component 401, the key sharing unit 1205 of the cryptographic management server apparatus 1201 uses the session key to encrypt one or more common keys generated by the key generating unit 1204, and transmits the encrypted common key(s) to the cryptographic hardware component 401 through the communication function 1302 of the client apparatus 1301 via the secure session (Step S100). When the cryptographic hardware component 401 receives one or more common keys, the key sharing unit uses the session key to decrypt the one or more common keys and the decrypted common key(s) are stored in the key storage unit 403 (Step S101).

When acquiring one or more common keys, the cryptographic hardware component 401 transmits a secure session disconnection notice to the client apparatus 1301 through the communication function 402 (Step S102). When the cryptographic management server apparatus 1201 receives the secure session disconnection notice, the cryptographic module dividing unit 1207 divides the cryptographic module selected in Step S94 into a predetermined size or less to generate a plurality of divided cryptographic modules (for example, N divided cryptographic modules) (Step S103). The cryptographic module encrypting unit 1208 encrypts the divided cryptographic modules with the common key generated by the key generating unit 1204 (Step S104).

In this case, when a plurality of common keys are generated in Step S97 and then transmitted to the cryptographic hardware component 401, the divided cryptographic modules may be encrypted with different common keys. In addition, the cryptographic management server apparatus 1201 and the cryptographic hardware component 401 may share a predetermined function, a plurality of keys may be calculated from the transmitted one key using the function, and different keys among the plurality of keys may be used to encrypt the divided cryptographic modules.

The communication function 1202 of the cryptographic management server apparatus 1201 transmits the encrypted divided cryptographic modules one by one to the client apparatus 1301 N times (Steps S105 and S106).

When the communication function 1302 of the client apparatus 1301 receives the encrypted divided cryptographic modules, it transmits to the cryptographic management server apparatus 1201 a cryptographic module reception result notice indicating that the divided cryptographic modules have normally been received (Step S107). Then, when the communication function 1202 of the cryptographic management server apparatus 1201 receives the cryptographic module reception result notice, the communication function 1202 of the cryptographic management server apparatus 1201 transmits to the client apparatus 1301 information indicating that an initial cryptographic module registration process has ended (Step S108).

In addition, when the communication function 1302 of the client apparatus 1301 does not receive the encrypted divided cryptographic modules, the communication function 1302 of the client apparatus 1301 transmits to the cryptographic management server apparatus 1201 a cryptographic module reception result notice indicating that the divided cryptographic modules have not normally been received. Then, when the communication function 1202 of the cryptographic management server apparatus 1201 receives the cryptographic module reception result notice, the communication function 1202 of the cryptographic management server apparatus 1201 retransmits the cryptographic modules. The number of times the communication function 1202 retransmits the cryptographic modules is larger than a predetermined value.

When the cryptographic modules are not normally received, it is considered that an error has occurred in the process, and the process ends.

When the communication function 1302 of the client apparatus 1301 receives information indicating that the initial cryptographic module registration process has ended, the cryptographic hardware management control unit 1305 transmits to the cryptographic hardware component 401 the cryptographic modules received from the cryptographic management server apparatus 1201 (Step S109).

Then, when the communication function 402 of the cryptographic hardware component 401 receives the encrypted divided cryptographic modules, the cryptographic module decrypting unit 405 reads out the common key stored in the key storage unit 403, uses the common key to decrypt the divided cryptographic modules (Step S110), and transmits the decrypted cryptographic modules to the client apparatus 1301 through the communication function 402 (Step S111).

The number of times the divided cryptographic modules are received or transmitted is equal to the number of divisions (N times). When the cryptographic hardware management control unit 1305 of the client apparatus 1301 receives the divided cryptographic modules the same number of times that is equal to the number of divided cryptographic modules, the cryptographic module combining unit 1307 combines all the received divided cryptographic modules (Step S112). When the cryptographic hardware management control unit 1305 of the client apparatus 1301 receives the combined cryptographic module, it implements the cryptographic module in the cryptographic module implementation unit 1306 such that the cryptographic module is available. The cryptographic hardware management control unit 1305 stores the cryptographic module stored in the cryptographic module implementation unit 1306 in the cryptographic module DB 1303 (Step S113).

Fifth Embodiment

Next, the operation of a cryptographic module distribution system distributing a key according to a fifth embodiment of the invention will be described. The fourth embodiment is an example of the operation of dividing a cryptographic module into a predetermined size and transmitting the divided cryptographic modules in addition to the first embodiment, but the invention is not limited thereto. A cryptographic module may be divided into a predetermined size and the divided cryptographic modules may be transmitted even when the cryptographic module having a MAC added thereto is distributed as in the second embodiment.

In the fifth embodiment, a cryptographic module to be distributed is divided, and a MAC is added to each of the divided cryptographic modules. The structure of the cryptographic module distribution system according to the fifth embodiment is the same as that according to the second embodiment, and a description of the same structure and process will be omitted. Hereinafter, only the structure and process peculiar to the fifth embodiment will be described.

Figure 17:
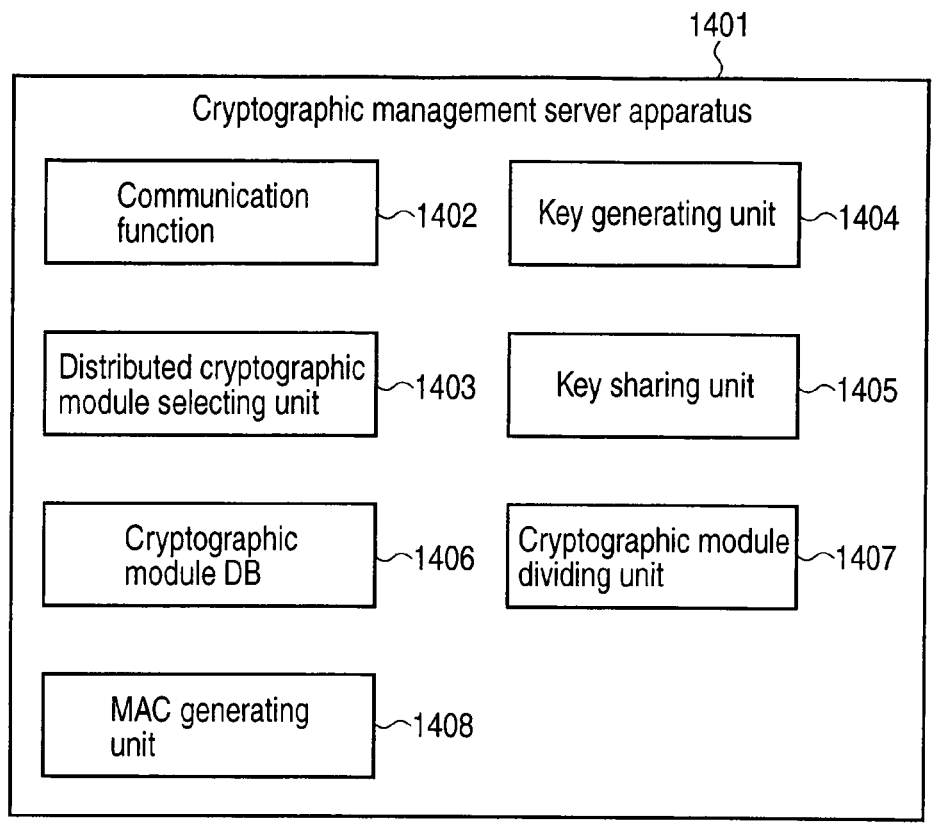
FIG. 17 is a block diagram illustrating the structure of a cryptographic management server apparatus according to a fifth embodiment of the invention.

FIG. 17 is a block diagram illustrating the structure of a cryptographic management server apparatus according to the fifth embodiment of the invention. A cryptographic management server apparatus 1401 includes a communication function 1402, a distributed cryptographic module selecting unit 1403, a key generating unit 1404, a key sharing unit 1405, a cryptographic module DB 1406, a cryptographic module dividing unit 1407, and a MAC generating unit 1408. The cryptographic management server apparatus 1401 corresponds to the cryptographic management server apparatus 101 shown in FIG. 1.

Figure 18:
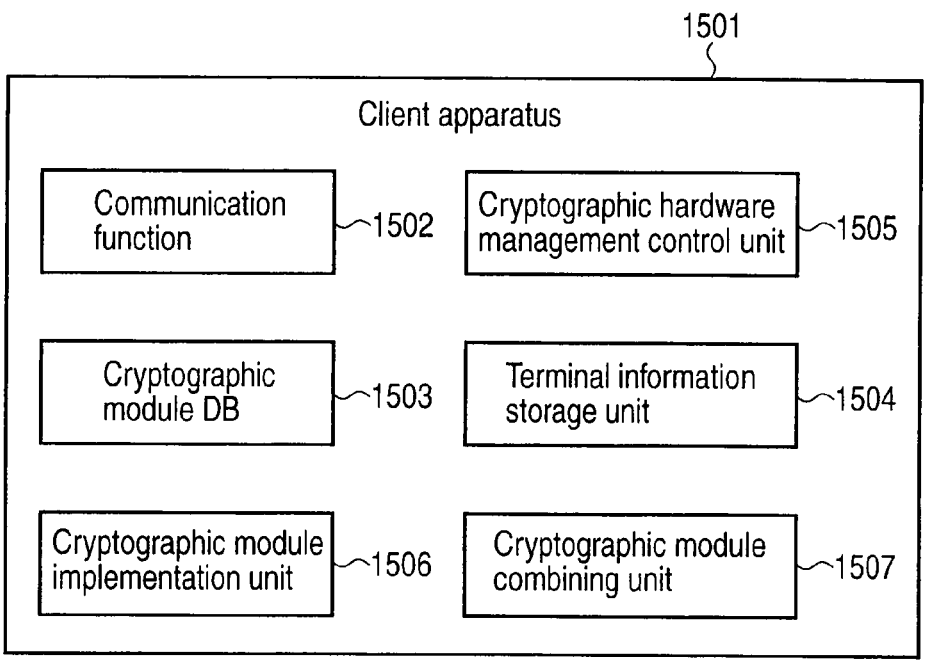
FIG. 18 is a block diagram illustrating the structure of a client apparatus according to the fifth embodiment.

FIG. 18 is a block diagram illustrating the structure of a client apparatus according to the fifth embodiment of the invention. A client apparatus 1501 includes a communication function 1502, a terminal information storage unit 1504, a cryptographic hardware management control unit 1505, a cryptographic module implementation unit 1506, and a cryptographic module combining unit 1507. The client apparatus 1501 corresponds to the client apparatus 102 shown in FIG. 1.

The structure of a cryptographic hardware component is the same as that of the cryptographic hardware component 701 according to the second embodiment. The cryptographic hardware component 701 corresponds to the cryptographic hardware component 103 shown in FIG. 1.

Next, an example of the operation of the fifth embodiment will be described with reference to FIG. 19.

Figure 19:
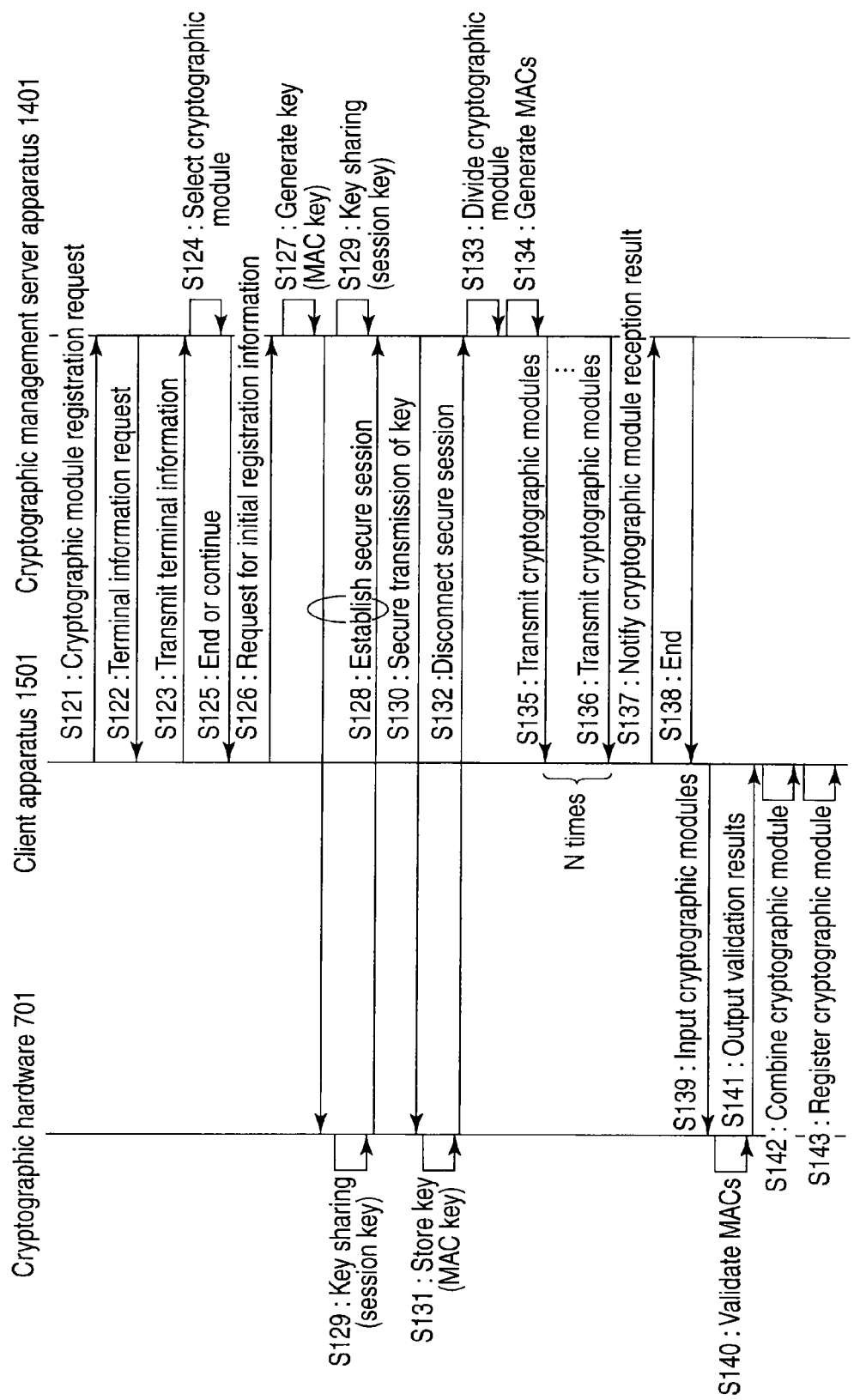
FIG. 19 is a sequence diagram illustrating an example of the operation of a cryptographic module distribution system according to the fifth embodiment.

FIG. 19 is a sequence diagram illustrating an example of the operation of the cryptographic module distribution system according to the fifth embodiment of the invention.

First, the communication function 1502 of the client apparatus 1501 transmits an initial cryptographic module registration request to the cryptographic management server apparatus 1401 (Step S121). When the communication function 1402 of the cryptographic management server apparatus 1401 receives the initial cryptographic module registration request, it transmits a terminal information request to the client apparatus 1501 (Step S122).

When the communication function 1502 of the client apparatus 1501 receives the transmitted terminal information request, the communication function 1502 transmits the terminal information of the client apparatus 1501 stored in the terminal information storage unit 1504 to the cryptographic management server apparatus 1401 (Step S123). When the communication function 1402 of the cryptographic management server apparatus 1401 receives the terminal information, the distributed cryptographic module selecting unit 1403 stores a correspondence table between the identification information of each terminal and the identification information of a cryptographic module in advance, and selects and reads out a cryptographic module corresponding to the terminal identification information of the client apparatus 1501, which has transmitted the request, as a cryptographic module that can be used by the client apparatus 1501 from the cryptographic module DB 1406, with reference to the correspondence table on the basis of the terminal identification information included in the received terminal information (Step S124).

When the distributed cryptographic module selecting unit 1403 selects a cryptographic module from the cryptographic module DB 1406, the communication function 1402 of the cryptographic management server apparatus 1401 transmits information indicating the continuation of the process to the client apparatus 1501. On the other hand, when the distributed cryptographic module selecting unit 1403 cannot select a cryptographic module that can be used by the client apparatus 1501, the communication function 1402 transmits information indicating the end of the process to the client apparatus 1501 (Step S125).

When the communication function 1502 of the client apparatus 1501 receives the information indicating the continuation of the process from the cryptographic management server apparatus 1401, it transmits a request for initial registration information to the cryptographic management server apparatus 1401 (Step S126). On the other hand, when the communication function 1502 of the client apparatus 1501 receives the information indicating the end of the process from the communication function 1402 of the cryptographic management server apparatus 1401, the communication between the client apparatus 1501 and the cryptographic management server apparatus 1401 ends.

When the communication function 1402 of the cryptographic management server apparatus 1401 receives the request for initial registration information, the key generating unit 1404 generates a MAC key for adding a MAC to the cryptographic module to be transmitted to the client apparatus 1501 (Step S127). In this case, the key generating unit 1404 may generate a plurality of MAC keys for adding a MAC to the cryptographic module. Then, the key sharing unit 1405 of the cryptographic management server apparatus 1401 shares a key with the key sharing unit 704 of the cryptographic hardware component 701 using a key sharing scheme. The key sharing scheme may be, for example, a Diffie-Hellman key exchange protocol.

When the key sharing unit 1405 of the cryptographic management server apparatus 1401 succeeds in generating a session key using the key sharing scheme, the cryptographic management server apparatus notifies the cryptographic hardware component 701 that a secure session has been established through the cryptographic hardware management control unit 1505 of the client apparatus 1501. Similarly, when the key sharing unit 704 of the cryptographic hardware component 701 succeeds in generating the session key, the cryptographic hardware component notifies the cryptographic management server apparatus 1401 that the secure session has been established (Steps S128 and S129). In this case, the key sharing unit 1405 of the cryptographic management server apparatus 1401 and the key sharing unit 704 of the cryptographic hardware component 701 communicate with each other via the secure session using the generated session key. For example, a transmitter side encrypts information and a receiver side decrypts the information using the session key.

When a secure session is established between the cryptographic management server apparatus 1401 and the cryptographic hardware component 701, the key sharing unit 1405 of the cryptographic management server apparatus 1401 uses the session key to encrypt one or more MAC keys generated by the key generating unit 1404, and transmits the encrypted MAC key(s) to the cryptographic hardware component 701 through the communication function 1502 of the client apparatus 1501 via the secure session (Step S130). When the cryptographic hardware component 701 receives one or more MAC keys, the key sharing unit uses the session key to decrypt the one or more MAC keys and the decrypted MAC key(s) are stored in the key storage unit 703 (Step S131).

When acquiring one or more MAC keys, the cryptographic hardware component 701 transmits a secure session disconnection notice to the client apparatus 1501 through the communication function 702 (Step S132). When the cryptographic management server apparatus 1401 receives the secure session disconnection notice, the cryptographic module dividing unit 1407 divides the cryptographic module selected in Step S124 into a predetermined size or less to generate a plurality of divided cryptographic modules (for example, N divided cryptographic modules) (Step S133). The MAC generating unit 1408 uses the MAC keys generated by the key generating unit 1404 to generate the MACs of the divided cryptographic modules (Step S134).

In this case, when a plurality of MAC keys are generated in Step S127 and then transmitted to the cryptographic hardware component 701, different MAC keys may be used for the divided cryptographic modules to generate the MACs. In addition, the cryptographic management server apparatus

1401 and the cryptographic hardware component 701 may share a predetermined function, a plurality of keys may be calculated from the transmitted one key using the function, and different keys among the plurality of keys may be used for the divided cryptographic modules to generate the MAC.

The communication function 1402 of the cryptographic management server apparatus 1401 transmits the divided cryptographic modules having the MACs added thereto one by one to the client apparatus 1501 N times (Steps S135 and S136).

When the communication function 1502 of the client apparatus 1501 receives the divided cryptographic modules having the MACs added thereto, it transmits to the cryptographic management server apparatus 1401 a cryptographic module reception result notice indicating that the divided cryptographic modules have normally been received (Step S137). Then, when the communication function 1402 of the cryptographic management server apparatus 1401 receives the cryptographic module reception result notice, the communication function 1402 of the cryptographic management server apparatus 1401 transmits to the client apparatus 1501 information indicating that an initial cryptographic module registration process has ended (Step S138).

In addition, when the communication function 1502 of the client apparatus 1501 does not receive the divided cryptographic modules having the MACs added thereto, the communication function 1502 of the client apparatus 1501 transmits to the cryptographic management server apparatus 1401 a cryptographic module reception result notice indicating that the divided cryptographic modules have not normally been received. Then, when the communication function 1402 of the cryptographic management server apparatus 1401 receives the cryptographic module reception result notice, the communication function 1402 of the cryptographic management server apparatus 1401 retransmits the cryptographic modules. The number of times the communication function 1402 retransmits the cryptographic modules is larger than a predetermined value. When the cryptographic modules are not normally received, it is considered that an error has occurred in the process, and the process ends.

When the communication function 1502 of the client apparatus 1501 receives information indicating that the initial cryptographic module registration process has ended, the cryptographic hardware management control unit 1505 transmits to the cryptographic hardware component 701 the divided cryptographic modules having the MACs added thereto that are received from the cryptographic management server apparatus 1401 (Step S139).

Then, when the communication function 702 of the cryptographic hardware component 701 receives the divided cryptographic modules having the MACs added thereto, the cryptographic module decrypting unit 405 reads out the MAC key stored in the key storage unit 703, uses the MAC key to validate the MAC (Step S140), and transmits a validation result indicating whether the MAC is valid to the client apparatus 1501 through the communication function 702 (Step S141).

The number of times the divided cryptographic modules are received or transmitted (Steps 139 to 141) is equal to the number of divisions (N times). When the cryptographic hardware management control unit 1505 of the client apparatus 1501 receives the divided cryptographic modules the same number of times that is equal to the number of divided cryptographic modules, the cryptographic module combining unit 1507 combines all the received divided cryptographic modules (Step S142). When the cryptographic hardware management control unit 1505 of the client apparatus 1501 receives the combined cryptographic module, it implements the cryptographic module in the cryptographic module implementation unit 1506 such that the cryptographic module is available. The cryptographic hardware management control unit 1505 stores the cryptographic module stored in the cryptographic module implementation unit 1506 in the cryptographic module DB 1503 (Step S143).

Sixth Embodiment

Next, the operation of a cryptographic module distribution system distributing a key according to a sixth embodiment of the invention will be described. The fifth embodiment is an example of the operation of dividing a cryptographic module into a predetermined size and transmitting the divided cryptographic modules in addition to the first embodiment, but the invention is not limited thereto. An operation of dividing a cryptographic module into a predetermined size and transmitting the divided cryptographic modules may be applied to the third embodiment in which the cryptographic module is encrypted, a MAC is added to the encrypted cryptographic module, and the encrypted cryptographic module having the MAC added thereto is transmitted.

In the sixth embodiment, a cryptographic module to be distributed is divided, the divided cryptographic modules are encrypted, and a MAC is added to each of the divided cryptographic modules. The structure of the cryptographic module distribution system according to the sixth embodiment is the same as that according to the third embodiment, and a description of the same structure and process will be omitted. Hereinafter, only the structure and process peculiar to the sixth embodiment will be described.

Figure 20:
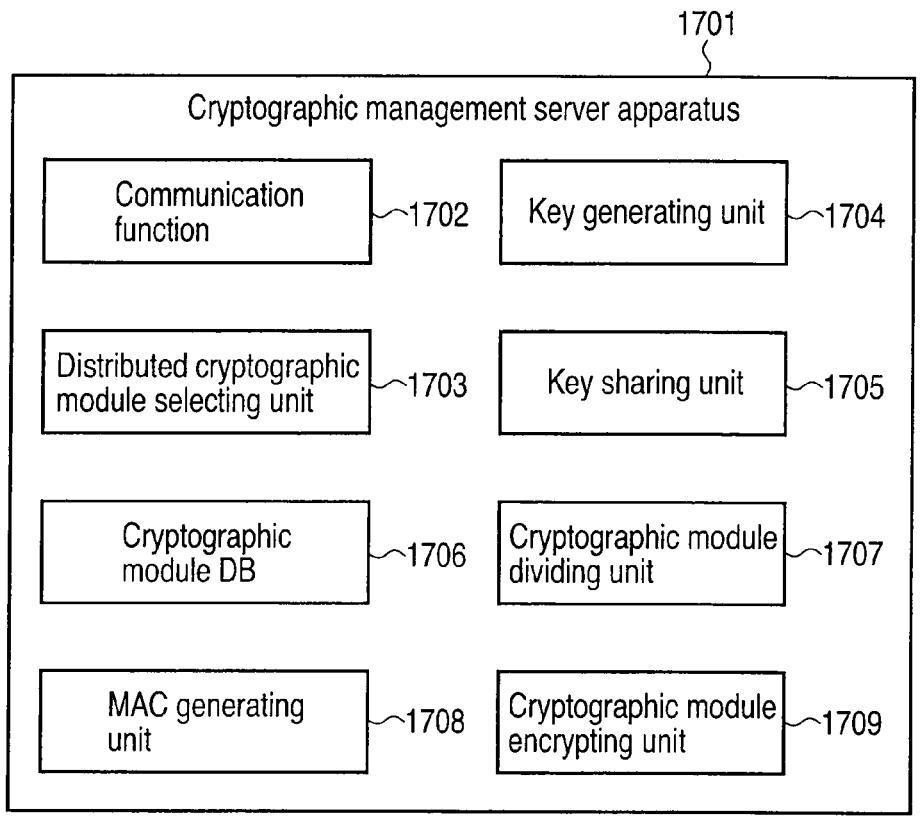
FIG. 20 is a block diagram illustrating the structure of a cryptographic management server apparatus according to a sixth embodiment of the invention.

FIG. 20 is a block diagram illustrating the structure of a cryptographic management server apparatus according to the sixth embodiment of the invention. A cryptographic management server apparatus 1701 includes a communication function 1702, a distributed cryptographic module selecting unit 1703, a key generating unit 1704, a key sharing unit 1705, a cryptographic module DB 1706, a cryptographic module dividing unit 1707, a MAC generating unit 1708, and a cryptographic module encrypting unit 1709. The cryptographic management server apparatus 1701 corresponds to the cryptographic management server apparatus 101 shown in FIG. 1.

Figure 21:
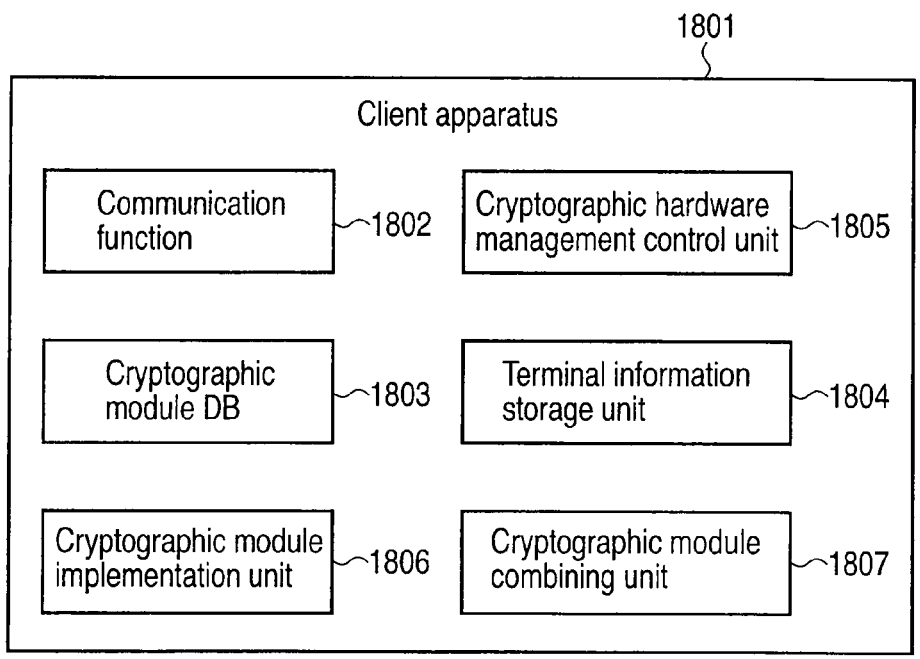
FIG. 21 is a block diagram illustrating the structure of a client apparatus according to the sixth embodiment.

FIG. 21 is a block diagram illustrating the structure of a client apparatus according to the sixth embodiment of the invention. A client apparatus 1801 includes a communication function 1802, a cryptographic module DB 1803, a terminal information storage unit 1804, a cryptographic hardware management control unit 1805, a cryptographic module implementation unit 1806, and a cryptographic module combining unit 1807. The client apparatus 1801 corresponds to the client apparatus 102 shown in FIG. 1.

The structure of a cryptographic hardware component according to this embodiment is the same as that of the cryptographic hardware component 1001 according to the third embodiment. The cryptographic hardware component 1001 corresponds to the cryptographic hardware component 103 shown in FIG. 1.

Next, an example of the operation of the sixth embodiment of the invention will be described with reference to FIG. 22.

FIG. 22 is a sequence diagram illustrating an example of the operation of the cryptographic module distribution system according to the sixth embodiment of the invention.

First, the communication function 1802 of the client apparatus 1801 transmits an initial cryptographic module registration request to the cryptographic management server apparatus 1701 (Step S151). When the communication function 1702 of the cryptographic management server apparatus 1701 receives the initial cryptographic module registration request, the cryptographic management server apparatus 1701 transmits a terminal information request to the client apparatus 1801 through the communication function 1702 (Step S152).

When the communication function 1802 of the client apparatus 1801 receives the transmitted terminal information request, the communication function 1802 transmits the terminal information of the client apparatus 1801 stored in the terminal information storage unit 1804 to the cryptographic management server apparatus 1701 (Step S153). When the communication function 1702 of the cryptographic management server apparatus 1701 receives the terminal information, the distributed cryptographic module selecting unit 1703 stores a correspondence table between the identification information of each terminal and the identification information of a cryptographic module in advance, and selects and reads out a cryptographic module corresponding to the terminal identification information of the client apparatus 1801, which has transmitted the request, as a cryptographic module that can be used by the client apparatus 1801 from the cryptographic module DB 1706, with reference to the correspondence table on the basis of the terminal identification information included in the received terminal information (Step S154).

When the distributed cryptographic module selecting unit 1703 selects a cryptographic module from the cryptographic module DB 1706, the communication function 1702 of the cryptographic management server apparatus 1701 transmits information indicating the continuation of the process to the client apparatus 1801. On the other hand, when the distributed cryptographic module selecting unit 1703 cannot select a cryptographic module that can be used by the client apparatus 1801, the cryptographic management server apparatus 1701 transmits information indicating the end of the process to the client apparatus 1801 through the communication function 1702 (Step S155).

When the communication function 1802 of the client apparatus 1801 receives the information indicating the continuation of the process from the cryptographic management server apparatus 1701, the client apparatus transmits a request for initial registration information to the cryptographic management server apparatus 1701 (Step S156). On the other hand, when the communication function 1802 of the client apparatus 1801 receives the information indicating the end of the process from the communication function 1702 of the cryptographic management server apparatus 1701, the communication between the client apparatus 1801 and the cryptographic management server apparatus 1701 ends.

When the communication function 1702 of the cryptographic management server apparatus 1701 receives the request for initial registration information, the key generating unit 1704 generates a common key for encrypting the cryptographic module to be transmitted to the client apparatus 1801 and a MAC key for adding a MAC to the cryptographic module (Step S157). In this case, the key generating unit 1704 may generate a plurality of common keys and a plurality of MAC keys. Then, the key sharing unit 1705 of the cryptographic management server apparatus 1701 shares a key with the key sharing unit 1004 of the cryptographic hardware component 1001 using a key sharing scheme. The key sharing scheme may be, for example, a Diffie-Hellman key exchange protocol.

When the key sharing unit 1705 of the cryptographic management server apparatus 1701 succeeds in generating a session key using the key sharing scheme, the cryptographic management server apparatus notifies the cryptographic hardware component 1001 that the secure session has been established through the cryptographic hardware management control unit 1805 of the client apparatus 1801. Similarly, when the key sharing unit 1004 of the cryptographic hardware component 1001 succeeds in generating the session key, the cryptographic hardware component notifies the cryptographic management server apparatus 1701 that the secure session has been established (Steps S158 and S159). In this case, the key sharing unit 1705 of the cryptographic management server apparatus 1701 and the key sharing unit 1004 of the cryptographic hardware component 1001 communicate with each other through the secure session using the generated session key. For example, a transmitter side encrypts information and a receiver side decrypts the information using the session key.

When a secure session is established between the cryptographic management server apparatus 1701 and the cryptographic hardware component 1001, the key sharing unit 1705 of the cryptographic management server apparatus 1701 uses the session key to encrypt the one or more common keys and MAC keys generated by the key generating unit 1704, and transmits the encrypted common keys and MAC keys to the cryptographic hardware component 1001 through the communication function 1802 of the client apparatus 1801 via the secure session (Step S160). When the cryptographic hardware component 1001 receives the one or more common keys and MAC keys, the key sharing unit uses the session key to decrypt the common keys and MAC keys and the decrypted common keys and MAC keys are stored in the key storage unit 1003 (Step S161).

Upon acquisition of one or more common keys and MAC keys, the cryptographic hardware component 1001 transmits a secure session disconnection notice to the client apparatus 1801 through the communication function 1002 (Step S162). When the cryptographic management server apparatus 1701 receives the secure session disconnection notice, the cryptographic module dividing unit 1707 divides the cryptographic module selected in Step S124 into a predetermined size or less to generate a plurality of divided cryptographic modules (for example, N divided cryptographic modules) (Step S163). The cryptographic module encrypting unit 1709 encrypts the divided cryptographic modules on the basis of the common keys generated by the key generating unit 1704. In addition, the MAC generating unit 1708 uses the MAC keys generated by the key generating unit 1704 to generate the MACs of the divided cryptographic modules (Step S164). Here, after the MACs of the cryptographic modules are generated, the cryptographic modules and the MACs may be combined with each other, and the combinations may be encrypted on the basis of the common keys generated by the key generating unit 1704.

In this case, when a plurality of common keys are generated in Step S157 and then transmitted to the cryptographic hardware component 1001, different common keys may be used to encrypt the divided cryptographic modules. In addition, the cryptographic management server apparatus 1701 and the cryptographic hardware component 1001 may share a predetermined function, a plurality of keys may be derived from the transmitted one key using the function, and different keys among the plurality of keys may be used to encrypt the divided cryptographic modules. Further, when a plurality of MAC keys are generated in Step S157 and then transmitted to the cryptographic hardware component 1001, different MAC keys may be used for the divided cryptographic modules to generate the MACs. In addition, the cryptographic management server apparatus 1701 and the cryptographic hardware component 1001 may share a predetermined function, a plurality of keys may be derived from the transmitted one key using the function, and different keys among the plurality of keys may be used for the divided cryptographic modules to generate the MACs.

The communication function 1702 of the cryptographic management server apparatus 1701 transmits the encrypted divided cryptographic modules having the MACs added thereto one by one to the client apparatus 1801 N times (Steps S165 and S166).

When the communication function 1802 of the client apparatus 1801 receives the encrypted divided cryptographic modules having the MACs added thereto, the client apparatus transmits to the cryptographic management server apparatus 1701 a cryptographic module reception result notice indicating that the encrypted divided cryptographic modules have normally been received (Step S167). Then, when the communication function 1702 of the cryptographic management server apparatus 1701 receives the cryptographic module reception result notice, the communication function 1702 of the cryptographic management server apparatus 1701 transmits to the client apparatus 1801 information indicating that an initial cryptographic module registration process has ended (Step S168).

In addition, when the communication function 1802 of the client apparatus 1801 does not receive the encrypted divided cryptographic modules having the MACs added thereto, the communication function 1802 of the client apparatus 1801 transmits to the cryptographic management server apparatus 1701 a cryptographic module reception result notice indicating that the divided cryptographic modules have not normally been received. Then, when the communication function 1702 of the cryptographic management server apparatus 1701 receives the cryptographic module reception result notice, the communication function 1702 of the cryptographic management server apparatus 1701 retransmits the cryptographic modules. The number of times the communication function 1702 retransmits the cryptographic modules is larger than a predetermined value. When the divided cryptographic modules are not normally received, it is considered that an error has occurred in the process, and the process ends.

When the communication function 1802 of the client apparatus 1801 receives information indicating that the initial cryptographic module registration process has ended, the cryptographic hardware management control unit 1805 transmits to the cryptographic hardware component 1001 the encrypted divided cryptographic modules having the MACs added thereto that are received from the cryptographic management server apparatus 1701 (Step S169).

Then, when the communication function 1002 of the cryptographic hardware component 1001 receives the encrypted divided cryptographic modules having the MACs added thereto, the cryptographic module decrypting unit 1005 reads out the common keys stored in the key storage unit 1003, uses the read common keys to encrypt the divided cryptographic modules. In addition, the MAC validation unit 1006 reads out the MAC keys stored in the key storage unit 1003, and uses the read MAC keys to validate the MACs (Step S170). The communication function 1002 transmits the decrypted divided cryptographic modules and a validation result indicating whether the MAC is valid to the client apparatus 1801 (Step S171).

The number of times the divided cryptographic modules are received or transmitted (Steps 169 to 171) is equal to the number of divisions (N times). When the cryptographic hardware management control unit 1805 of the client apparatus 1801 receives the divided cryptographic modules the same number of times that is equal to the number of divided cryptographic modules, the cryptographic module combining unit 1807 combines all the received divided cryptographic modules (Step S172). When the cryptographic hardware management control unit 1805 of the client apparatus 1801 receives the combined cryptographic module, it implements the cryptographic module in the cryptographic module implementation unit 1806 such that the cryptographic module is available. The cryptographic hardware management control unit 1805 stores the cryptographic module stored in the cryptographic module implementation unit 1806 in the cryptographic module DB 1803 (Step S173).

As described above, according to the embodiments of the invention, when a server transmits a cryptographic module (program) to a terminal apparatus, the terminal apparatus uses hardware for performing cryptographic processing to validate the transmitted data (program). When it is determined that the data is valid, the data is incorporated into the terminal apparatus, and it is determined whether the transmitted cryptographic module (program) is valid. Once the cryptographic module (program) transmitted from the server is incorporated into the terminal apparatus, the next cryptographic module (program) is received without using the hardware for performing cryptographic processing, and the received cryptographic module is incorporated into the terminal apparatus. In this case, it is also possible to validate the data (program).

That is, when the client apparatus does not have the cryptographic modules (programs) at all, the hardware for cryptographic processing is supplementarily used to transmit the cryptographic modules from the server to the client apparatus such that the client apparatus can use a new cryptographic module.

Further, a cryptographic module may be distributed by recording a program for allowing a computer to execute the functions of the units according to the above-mentioned embodiments on a computer-readable recording medium, and allowing a computer system to read the program recorded on the recording medium and execute the read program. The "computer system" includes an OS and hardware components, such as peripheral apparatuses. The "computer system" also includes a WWW system having a homepage providing environment (or a display environment). The "computer-readable recording media" include portable media such as a flexible disk, a magneto-optical disk, a read only memory (ROM), and a compact disk read only memory (CD-ROM), and a storage device such as a hard disk device built in the computer system. The "computer-readable recording media" also includes a volatile memory such as a random access memory (RAM), for temporarily storing programs, in a computer system that functions as a server or a client when a program is transmitted through a communication line such as a telephone line, or a network such as the internet.

The program may be transmitted from a computer system having this program stored in, for example, its storage device to another computer system through a transmission medium or through transmission waves in the transmission medium. In this case, the "transmission medium" transmitting the program is a medium having a function of transmitting information, such as a network (communication network) like the Internet, or a communication channel (communication line) like a telephone line. The program may be for realizing some of the above-described functions. The program may be a so-called differential file (differential program) that can be obtained by combining the above-described functions with the programs that have already been recorded in a computer system.

What is claimed is:

1. A cryptographic module distribution system comprising:
a cryptographic management server apparatus;
a cryptographic apparatus; and
a client apparatus,
wherein the cryptographic management server apparatus, the cryptographic apparatus, and the client apparatus are connected so as to communicate with one other,
the cryptographic management server apparatus includes:
a cryptographic module storage device which stores a cryptographic module;
a key generating device which generates a common key for encrypting the cryptographic module to be transmitted to the client apparatus;
a key sharing device configured to share a shared key with the cryptographic apparatus using a key sharing scheme;
a key encrypting device configured to encrypt the common key with the shared key, and transmit the encrypted common key to the cryptographic apparatus through the client apparatus;
a cryptographic module encrypting device configured to encrypt the cryptographic module with the common key; and
a client apparatus communication device configured to transmit the encrypted cryptographic module to the client apparatus,
the cryptographic apparatus includes:
a key sharing device configured to share a shared key with the cryptographic management server apparatus using the key sharing scheme;
a key decrypting device configured to receive the encrypted common key, and decrypt the encrypted common key with the shared key;
a cryptographic module decrypting device configured to receive the encrypted cryptographic module from the client apparatus, and decrypt the received encrypted cryptographic module with the common key; and
a client apparatus communication device configured to transmit the decrypted cryptographic module to the client apparatus, and
the client apparatus includes:
a server communication device configured to receive the encrypted cryptographic module from the cryptographic management server apparatus;
a cryptographic apparatus communication device configured to transmit the received encrypted cryptographic module to the cryptographic apparatus, and receive the decrypted cryptographic module from the cryptographic apparatus; and
a cryptographic module storage device which stores the cryptographic module received from the cryptographic apparatus communication device.

2. The cryptographic module distribution system according to claim 1,
wherein the cryptographic management server apparatus further includes:
a cryptographic module dividing device configured to divide the cryptographic module into a data size that can be processed by the cryptographic apparatus to generate divided cryptographic modules,
the cryptographic module encrypting device uses the common key to encrypt each of the divided cryptographic modules,
the client apparatus communication device transmits all the encrypted divided cryptographic modules to the client apparatus,
the client apparatus communication device of the cryptographic apparatus receives the encrypted divided cryptographic modules from the client apparatus, and transmits to the client apparatus the divided cryptographic modules decrypted with the common key,
the cryptographic module decrypting device uses the common key to decrypt the encrypted divided cryptographic modules received from the client apparatus,
the client apparatus further includes:
a cryptographic module combining device configured to combine all the divided cryptographic modules received from the cryptographic apparatus communication device to restore the original cryptographic module,
the server communication device receives all the encrypted divided cryptographic modules from the cryptographic management server apparatus, and
the cryptographic apparatus communication device transmits the encrypted divided cryptographic modules to the cryptographic apparatus, receives the decrypted divided cryptographic modules, and stores the cryptographic module combined by the cryptographic module combining device in the cryptographic module storage device.

3. The cryptographic module distribution system according to claim 2,
wherein the encrypted divided cryptographic modules are encrypted by at least two or more different keys.

4. A cryptographic module distribution system comprising:
a cryptographic management server apparatus;
a cryptographic apparatus; and
a client apparatus,
wherein the cryptographic management server apparatus, the cryptographic apparatus, and the client apparatus are connected so as to communicate with each other,
the cryptographic management server apparatus includes:
a cryptographic module storage device which stores a cryptographic module;
a message authentication code key generating device which generates a message authentication code key for generating a message authentication code;
a key sharing device configured to share a shared key with the cryptographic apparatus using a key sharing scheme;
a message authentication code key encrypting device configured to encrypt the message authentication code key with the shared key, and transmit the encrypted message authentication code key to the cryptographic apparatus through the client apparatus;
a message authentication code generating device configured to generate a message authentication code for identifying the cryptographic module with the message authentication code key; and
a client apparatus communication device configured to transmit the cryptographic module and the message authentication code to the client apparatus,
the cryptographic apparatus includes:
a key sharing device configured to share the shared key with the cryptographic management server apparatus using the key sharing scheme, the shared key being stored in a key storage device;
a message authentication code key decrypting device configured to receive the encrypted message authentication code key, and decrypt the encrypted message authentication code key with the shared key, the message authentication code key being stored in the key storage device;
a message authentication code validation device which receives the message authentication code from the client apparatus, and uses the message authentication code key stored in the key storage device to validate the received message authentication code; and a client apparatus communication device configured to transmit the validation result to the client apparatus, and the client apparatus includes:

a server communication device configured to receive the cryptographic module and the message authentication code from the cryptographic management server apparatus;

a cryptographic apparatus communication device configured to transmit the message authentication code received from the server communication device to the cryptographic apparatus, and receive the validation result of the message authentication code; and a cryptographic module storage device which stores the cryptographic module received from the cryptographic apparatus communication device when the validation result indicates that the message authentication code is valid.

5. The cryptographic module distribution system according to claim 4, wherein the cryptographic management server apparatus further includes:

a key generating device which generates a common key for encrypting the cryptographic module to be transmitted to the client apparatus, a key encrypting device configured to encrypt the common key with the shared key, and transmit the encrypted common key to the cryptographic apparatus through the client apparatus;

a cryptographic module encrypting device configured to encrypt the cryptographic module with the common key, the client apparatus communication device transmits to the client apparatus the cryptographic module encrypted by the cryptographic module encrypting device, the client apparatus communication device of the cryptographic apparatus receives the encrypted cryptographic module, the encrypted common key, and the message authentication code from the client apparatus, decrypts the encrypted common key with the shared key, and transmits to the client apparatus the cryptographic module obtained by decrypting the encrypted cryptographic module with the common key and the validation result of the message authentication code, the cryptographic apparatus communication device transmits to the cryptographic apparatus the encrypted cryptographic module, the encrypted common key, and the message authentication code received from the server communication device, and receives the decrypted cryptographic module and the validation result of the message authentication code, and when the validation result received from the cryptographic apparatus communication device indicates that the message authentication code is valid, the client apparatus stores the decrypted cryptographic module in the cryptographic module storage device.

6. The cryptographic module distribution system according to claim 5, wherein the cryptographic management server apparatus further includes:

a cryptographic module dividing device configured to divide the cryptographic module into a data size that can be processed by the cryptographic apparatus to generate divided cryptographic modules, the cryptographic module encrypting device uses the common key to encrypt each of the divided cryptographic modules, the client apparatus communication device transmits all the encrypted divided cryptographic modules to the client apparatus, the client apparatus communication device of the cryptographic apparatus receives the encrypted divided cryptographic modules from the client apparatus, and transmits to the client apparatus the divided cryptographic modules decrypted with the common key, the cryptographic module decrypting device uses the common key to decrypt the encrypted divided cryptographic modules received from the client apparatus, the client apparatus further includes:

a cryptographic module combining device configured to combine all the divided cryptographic modules received from the cryptographic apparatus communication device to restore the original cryptographic module, the server communication device receives all the encrypted divided cryptographic modules from the cryptographic management server apparatus, and the cryptographic apparatus communication device transmits the encrypted divided cryptographic modules to the cryptographic apparatus, receives the decrypted divided cryptographic modules, and stores the cryptographic module combined by the cryptographic module combining device in the cryptographic module storage device.

7. The cryptographic module distribution system according to claim 6, wherein the encrypted divided cryptographic modules are encrypted by at least two or more different keys.

8. The cryptographic module distribution system according to claim 4, wherein the cryptographic management server apparatus further includes:

a cryptographic module dividing device configured to divide the cryptographic module into a data size that can be processed by the cryptographic apparatus to generate divided cryptographic modules, the message authentication code generating device uses the message authentication code key to generate message authentication codes for the divided cryptographic modules, the client apparatus communication device transmits all of the divided cryptographic modules and the message authentication codes to the client apparatus, the client apparatus communication device of the cryptographic apparatus receives the divided cryptographic modules and the message authentication codes from the client apparatus, and transmits the validation results of the message authentication codes using the message authentication code key to the client apparatus, the message authentication code validation device performs a process of validating the message authentication codes using the message authentication code key on the divided cryptographic modules and the message authentication codes received from the client apparatus, the client apparatus further includes:

a cryptographic module combining device which combines all the received divided cryptographic modules to restore the original cryptographic module, the server communication device receives all of the divided cryptographic modules and the message authentication codes from the cryptographic management server apparatus, the cryptographic apparatus communication device transmits the received divided cryptographic modules and message authentication codes to the cryptographic apparatus, and receives the validation results of the message authentication codes, when the validation results received from the cryptographic apparatus communication device indicate that all the message authentication codes are valid, the cryptographic apparatus stores the cryptographic module combined by the cryptographic module combining device in the cryptographic module storage device.

9. The cryptographic module distribution system according to claim 8, wherein the message authentication codes are generated by at least two or more different keys.

10. The cryptographic module distribution system according to claim 5, wherein the cryptographic management server apparatus further includes:

a cryptographic module dividing device configured to divide the cryptographic module into a data size that can be processed by the cryptographic apparatus to generate divided cryptographic modules, the message authentication code generating device uses the message authentication code key to generate message authentication codes for the divided cryptographic modules, the client apparatus communication device transmits all of the divided cryptographic modules and the message authentication codes to the client apparatus, the client apparatus communication device of the cryptographic apparatus receives the divided cryptographic modules and the message authentication codes from the client apparatus, and transmits the validation results of the message authentication codes using the message authentication code key to the client apparatus, the message authentication code validation device performs a process of validating the message authentication codes using the message authentication code key on the divided cryptographic modules and the message authentication codes received from the client apparatus, the client apparatus further includes:

a cryptographic module combining device which combines all the received divided cryptographic modules to restore the original cryptographic module, the server communication device receives all of the divided cryptographic modules and the message authentication codes from the cryptographic management server apparatus, the cryptographic apparatus communication device transmits the received divided cryptographic modules and message authentication codes to the cryptographic apparatus, and receives the validation results of the message authentication codes, when the validation results received from the cryptographic apparatus communication device indicate that all the message authentication codes are valid, the cryptographic apparatus stores the cryptographic module combined by the cryptographic module combining device in the cryptographic module storage device.

11. The cryptographic module distribution system according to claim 10, wherein the message authentication codes are generated by at least two or more different keys.

12. A cryptographic management server apparatus which communicates with a cryptographic apparatus and a client apparatus and distributes a cryptographic module to the client apparatus, the cryptographic management server apparatus comprising:

a cryptographic module storage device which stores the cryptographic module;

a key generating device which generates a common key for encrypting the cryptographic module to be transmitted to the client apparatus;

a key sharing device configured to share a shared key with the cryptographic apparatus using a key sharing scheme;

a key encrypting device configured to encrypt the common key with the shared key, and transmit the encrypted common key to the cryptographic apparatus through the client apparatus;

a cryptographic module encrypting device configured to encrypt the cryptographic module with the common key; and a client apparatus communication device configured to transmit the encrypted cryptographic module to the client apparatus.

13. The cryptographic management server apparatus according to claim 12, further comprising:

a cryptographic module dividing device configured to divide the cryptographic module into a data size that can be processed by the cryptographic apparatus to generate divided cryptographic modules, wherein the cryptographic module encrypting device uses the common key to encrypt each of the divided cryptographic modules, and the client apparatus communication device transmits all the encrypted divided cryptographic modules to the client apparatus.

14. A cryptographic management server apparatus which communicates with a cryptographic apparatus and a client apparatus and distributes a cryptographic module to the client apparatus, the cryptographic management server apparatus comprising:

a cryptographic module storage device which stores the cryptographic module;

a message authentication code key generating device which generates a message authentication code key for generating a message authentication code;

a key sharing device configured to share a shared key with the cryptographic apparatus using a key sharing scheme;

a message authentication code key encrypting device configured to encrypt the message authentication code key with the shared key, and transmit the encrypted message authentication code key to the cryptographic apparatus through the client apparatus;

a message authentication code generating device configured to generate a message authentication code for identifying the cryptographic module with the message authentication code key; and a client apparatus communication device configured to transmit the cryptographic module and the message authentication code to the client apparatus.

15. The cryptographic management server apparatus according to claim 14, further comprising:

a key generating device which generates a common key for encrypting the cryptographic module to be transmitted to the client apparatus, a key encrypting device configured to encrypt the common key with the shared key, and transmit the encrypted common key to the cryptographic apparatus through the client apparatus;

a cryptographic module encrypting device configured to encrypt the cryptographic module with the common key, wherein the client apparatus communication device transmits the encrypted cryptographic module to the client apparatus.

16. The cryptographic management server apparatus according to claim 15, further comprising:
- a cryptographic module dividing device configured to divide the cryptographic module into a data size that can be processed by the cryptographic apparatus to generate divided cryptographic modules,
- wherein the cryptographic module encrypting device uses the common key to encrypt each of the divided cryptographic modules, and
- the client apparatus communication device transmits all the encrypted divided cryptographic modules to the client apparatus.

17. The cryptographic management server apparatus according to claim 14, further comprising:
- a cryptographic module dividing device configured to divide the cryptographic module into a data size that can be processed by the cryptographic apparatus to generate divided cryptographic modules,
- wherein the message authentication code generating device uses the message authentication code key to generate message authentication codes for the divided cryptographic modules, and
- the client apparatus communication device transmits all of the divided cryptographic modules and the message authentication codes to the client apparatus.

18. The cryptographic management server apparatus according to claim 15, further comprising:
- a cryptographic module dividing device configured to divide the cryptographic module into a data size that can be processed by the cryptographic apparatus to generate divided cryptographic modules,
- wherein the message authentication code generating device uses the message authentication code key to generate message authentication codes for the divided cryptographic modules, and
- the client apparatus communication device transmits all of the divided cryptographic modules and the message authentication codes to the client apparatus.

19. A client apparatus which communicates with a cryptographic management server apparatus and a cryptographic apparatus, and receives a cryptographic module from the cryptographic management server apparatus, the client apparatus comprising:
- a server communication device configured to receive an encrypted cryptographic module from the cryptographic management server apparatus, the encrypted cryptographic module being encrypted by a common key, the common key sharing between the cryptographic management server apparatus and cryptographic apparatus using a common key encryption scheme with a shared key, the shared key sharing between the cryptographic management server apparatus and cryptographic apparatus using a key sharing scheme;
- a cryptographic apparatus communication device configured to transmit the received encrypted cryptographic module to the cryptographic apparatus, and receive the decrypted cryptographic module from the cryptographic apparatus, the decrypted cryptographic module being decrypted by the common key; and
- a cryptographic module storage device which stores the cryptographic module received from the cryptographic apparatus communication device.

20. The client apparatus according to claim 19, further comprising:
- a cryptographic module combining device configured to combine all the divided cryptographic modules received from the cryptographic apparatus communication device to restore the original cryptographic module,
- wherein the server communication device receives all the encrypted divided cryptographic modules from the cryptographic management server apparatus, the encrypted divided cryptographic modules being encrypted by the common key, and
- the cryptographic apparatus communication device transmits the encrypted divided cryptographic modules to the cryptographic apparatus, receives the decrypted divided cryptographic modules, and stores the cryptographic module combined by the cryptographic module combining device in the cryptographic module storage device, the decrypted divided cryptographic modules being decrypted by the common key.

21. A client apparatus which communicates with a cryptographic management server apparatus and a cryptographic apparatus and receives a cryptographic module from the cryptographic management server apparatus, the client apparatus comprising:
- a server communication device configured to receive the cryptographic module and a message authentication code from the cryptographic management server apparatus, the message authentication code being generated by a message authentication code key, the message authentication code key sharing between the cryptographic management server apparatus and cryptographic apparatus using a common key encryption scheme with a shared key, the shared key sharing between the cryptographic management server apparatus and cryptographic apparatus using a key sharing scheme;
- a cryptographic apparatus communication device configured to transmit the message authentication code received from the server communication device to the cryptographic apparatus, and receive the validation result of the message authentication code, the message authentication code being validated by the message authentication code key; and
- a cryptographic module storage device which stores the cryptographic module received from the cryptographic apparatus communication device when the validation result indicates that the message authentication code is valid.

22. The client apparatus according to claim 21,
- wherein the cryptographic apparatus communication device transmits to the cryptographic apparatus the encrypted cryptographic module and the message authentication code received from the server communication device, and receives the decrypted cryptographic module and the validation result of the message authentication code, the encrypted cryptographic module being encrypted by the common key, the decrypted cryptographic module being decrypted by the common key, and
- when the validation result received from the cryptographic apparatus communication device indicates that the message authentication code is valid, the decrypted cryptographic module is stored in the cryptographic module storage device.

23. The client apparatus according to claim 22, further comprising:
- a cryptographic module combining device configured to combine all the divided cryptographic modules received from the cryptographic apparatus communication device to restore the original cryptographic module, wherein the server communication device receives all the encrypted divided cryptographic modules from the cryptographic management server apparatus, the encrypted divided cryptographic modules being encrypted by the common key, and the cryptographic apparatus communication device transmits the encrypted divided cryptographic modules to the cryptographic apparatus, receives the decrypted divided cryptographic modules, and stores the cryptographic module combined by the cryptographic module combining device in the cryptographic module storage device, the decrypted divided cryptographic modules being decrypted by the common key.

24. The client apparatus according to claim 21, further comprising:
 a cryptographic module combining device which combines all the received divided cryptographic modules to restore the original cryptographic module,
 wherein the server communication device receives all of the divided cryptographic modules and the message authentication codes from the cryptographic management server apparatus,
 the cryptographic apparatus communication device transmits the received divided cryptographic modules and message authentication codes to the cryptographic apparatus, and receives the validation results of the message authentication codes, and
 when the validation results received from the cryptographic apparatus communication device indicate that all the message authentication codes are valid, the cryptographic module combined by the cryptographic module combining device is stored in the cryptographic module storage device.

25. The client apparatus according to claim 22, further comprising:
 a cryptographic module combining device which combines all the received divided cryptographic modules to restore the original cryptographic module,
 wherein the server communication device receives all of the divided cryptographic modules and the message authentication codes from the cryptographic management server apparatus,
 the cryptographic apparatus communication device transmits the received divided cryptographic modules and message authentication codes to the cryptographic apparatus, and receives the validation results of the message authentication codes, and
 when the validation results received from the cryptographic apparatus communication device indicate that all the message authentication codes are valid, the cryptographic module combined by the cryptographic module combining device is stored in the cryptographic module storage device.

26. A cryptographic apparatus which communicates with a cryptographic management server apparatus and a client apparatus and performs cryptographic processing when a cryptographic module is distributed from the cryptographic management server apparatus to the client apparatus, the cryptographic apparatus comprising:
 a key sharing device configured to share a shared key with the cryptographic management server apparatus using a key sharing scheme;
 a key decrypting device configured to receive an encrypted common key from the client apparatus, and decrypt the encrypted common key with the shared key;
 a cryptographic module decrypting device configured to receive an encrypted cryptographic module from the client apparatus, and decrypt the received encrypted cryptographic module with the common key; and
 a client apparatus communication device configured to transmit the decrypted cryptographic module to the client apparatus.

27. The cryptographic apparatus according to claim 26,
wherein the client apparatus communication device receives encrypted divided cryptographic modules from the client apparatus, and transmits to the client apparatus the divided cryptographic modules decrypted with the common key, and
the cryptographic module decrypting device uses the common key to decrypt the encrypted divided cryptographic modules received from the client apparatus.

28. A cryptographic apparatus which communicates with a cryptographic management server apparatus and a client apparatus and performs cryptographic processing when a cryptographic module is distributed from the cryptographic management server apparatus to the client apparatus, the cryptographic apparatus comprising:
 a key sharing device configured to share a shared key with the cryptographic management server apparatus using the key sharing scheme, the shared key being stored in a key storage device;
 a message authentication code key decrypting device configured to receive an encrypted message authentication code key from the client apparatus, and decrypt the encrypted message authentication code key with the shared key, the message authentication code key being stored in the key storage device;
 a message authentication code validation device which receives a message authentication code from the client apparatus, and uses the message authentication code key stored in the key storage device to validate the received message authentication code; and
 a client apparatus communication device configured to transmit the validation result to the client apparatus.

29. The cryptographic apparatus according to claim 28,
wherein the client apparatus communication device receives an encrypted cryptographic module, an encrypted common key, and the message authentication code from the client apparatus, decrypts the encrypted common key with the shared key, and transmits to the client apparatus the cryptographic module obtained by decrypting the encrypted cryptographic module with the common key and the validation result of the message authentication code.

30. The cryptographic apparatus according to claim 29,
wherein the client apparatus communication device receives encrypted divided cryptographic modules from the client apparatus, and transmits to the client apparatus the divided cryptographic modules decrypted with the common key, and
the cryptographic module decrypting device uses the common key to decrypt the encrypted divided cryptographic modules received from the client apparatus.

31. The cryptographic apparatus according to claim 28,
wherein the client apparatus communication device receives divided cryptographic modules and message authentication codes from the client apparatus, and transmits the validation result of the message authentication codes using the message authentication code key to the client apparatus, and
the message authentication code validation device performs a process of validating the message authentication codes using the message authentication code key on the divided cryptographic modules and the message authentication codes received from the client apparatus.

32. The cryptographic apparatus according to claim 29, wherein the client apparatus communication device receives divided cryptographic modules and message authentication codes from the client apparatus, and transmits the validation result of the message authentication codes using the message authentication code key to the client apparatus, and the message authentication code validation device performs a process of validating the message authentication codes using the message authentication code key on the divided cryptographic modules and the message authentication codes received from the client apparatus.

33. A cryptographic management program which is recorded on a non-transitory computer readable recording medium used for a cryptographic management server apparatus which can communicate with a cryptographic apparatus and a client apparatus, the program comprising:

a program code which allows the cryptographic management server apparatus to sequentially store a cryptographic module in a cryptographic module storage device;

a program code which allows the cryptographic management server apparatus to sequentially generate a common key for encrypting the cryptographic module to be transmitted to the client apparatus;

a program code which allows the cryptographic management server apparatus to sequentially share a shared key with the cryptographic apparatus using a key sharing scheme;

a program code which allows the cryptographic management server apparatus to sequentially encrypt the common key with the shared key, and transmit the encrypted common key to the cryptographic apparatus through the client apparatus;

a program code which allows the cryptographic management server apparatus to sequentially encrypt the cryptographic module using the common key; and a program code which allows the cryptographic management server apparatus to sequentially transmit the encrypted cryptographic module to the client apparatus.

34. A client program which is recorded on a non-transitory computer readable recording medium used for a client apparatus which can communicate with a cryptographic management server apparatus and a cryptographic apparatus, the program comprising:

a program code which allows the client apparatus to sequentially receive an encrypted cryptographic module from the cryptographic management server apparatus, the encrypted cryptographic module being encrypted by a common key, the common key sharing between the cryptographic management server apparatus and cryptographic apparatus using a common key encryption scheme with a shared key, the shared key sharing between the cryptographic management server apparatus and cryptographic apparatus using a key sharing scheme;

a program code which allows the client apparatus to sequentially transmit the received encrypted cryptographic module to the cryptographic apparatus and to receive the decrypted cryptographic module from the cryptographic apparatus, the decrypted cryptographic module being decrypted by the common key; and a program code which allows the client apparatus to sequentially store the cryptographic module received from a cryptographic apparatus communication device in a cryptographic module storage device.

35. A program which is recorded on a non-transitory computer readable recording medium used for a cryptographic apparatus which can communicate with a cryptographic management server apparatus and a client apparatus, the program comprising:

a program code which allows the cryptographic apparatus to sequentially share a shared key with the cryptographic management server apparatus using a key sharing scheme;

a program code which allows the cryptographic apparatus to sequentially receive an encrypted common key from the client apparatus, and decrypt the encrypted common key with the shared key;

a program code which allows the cryptographic apparatus to sequentially receive an encrypted cryptographic module from the client apparatus and to decrypt the received encrypted cryptographic module using the common key; and a program code which allows the cryptographic apparatus to sequentially transmit the decrypted cryptographic module to the client apparatus.

* * * * *